(12) United States Patent
Dong et al.

(10) Patent No.: US 11,569,731 B2
(45) Date of Patent: *Jan. 31, 2023

(54) CONTROL METHOD FOR AN AC-DC CONVERSION CIRCUIT

(71) Applicant: Delta Electronics (Shanghai) Co., Ltd., Shanghai (CN)

(72) Inventors: Kai Dong, Shanghai (CN); Lin Wang, Shanghai (CN); Shuailin Du, Shanghai (CN); Junhao Ji, Shanghai (CN); Hui Huang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/659,178

(22) Filed: Apr. 14, 2022

(65) Prior Publication Data

US 2022/0263402 A1 Aug. 18, 2022

Related U.S. Application Data

(63) Continuation of application No. 17/199,472, filed on Mar. 12, 2021, now Pat. No. 11,342,834.

(30) Foreign Application Priority Data

Mar. 25, 2020 (CN) .......................... 202010217069.5

(51) Int. Cl.
*H02M 1/12* (2006.01)
*H02M 7/06* (2006.01)
(Continued)

(52) U.S. Cl.
CPC ............. *H02M 1/12* (2013.01); *H02M 1/083* (2013.01); *H02M 7/06* (2013.01);
(Continued)

(58) Field of Classification Search
CPC .......... H02M 1/12; H02M 1/083; H02M 7/06; H02M 7/53873; H02M 1/0003;
(Continued)

(56) References Cited

U.S. PATENT DOCUMENTS 5,907,223 A * 5/1999 Gu ........................ H02M 5/225
315/307
7,295,452 B1 * 11/2007 Liu ...................... H02M 1/4225
323/284

(Continued)

FOREIGN PATENT DOCUMENTS

| CN | 101018017 A | 8/2007 |
| CN | 102969909 A | 3/2013 |

(Continued)

OTHER PUBLICATIONS

Li et al., "Flying-Capacitor-Based Hybrid LLC Converters With Input Voltage Autobalance Ability for High Voltage Applications," in IEEE Transactions on Power Electronics, vol. 31, No. 3, pp. 1908-1920, Mar. 2016.

(Continued)

*Primary Examiner* — Yusef A Ahmed
(74) *Attorney, Agent, or Firm* — CKC & Partners Co., LLC

(57) ABSTRACT

The present disclosure provides a control method for an AC-DC conversion circuit. The method includes: in an entire load range, acquiring circuit parameter information of the AC-DC conversion circuit; limiting an actual switching frequency or an actual switching period of the AC-DC conversion circuit within a preset working range according to the circuit parameter information. The AC-DC conversion circuit can meet requirements of Total Harmonic Distortion (THD), Power Factor (PF), efficiency and Electromagnetic Interference (EMI) and the like by adjusting the working (Continued)

information of the AC-DC conversion circuit through the preset working range.

1 Claim, 20 Drawing Sheets

(51) Int. Cl.
| | |
|---|---|
| *H02M 1/08* | (2006.01) |
| *H02M 7/5387* | (2007.01) |
| *H02M 1/00* | (2006.01) |
| *H02M 1/44* | (2007.01) |
| *H02M 1/42* | (2007.01) |
| *H02M 7/219* | (2006.01) |

(52) U.S. Cl.
CPC ...... *H02M 7/53873* (2013.01); *H02M 1/0003* (2021.05); *H02M 1/0054* (2021.05); *H02M 1/0058* (2021.05); *H02M 1/4233* (2013.01); *H02M 1/44* (2013.01); *H02M 7/219* (2013.01)

(58) Field of Classification Search
CPC ............ H02M 1/0054; H02M 1/0058; H02M 1/4233; H02M 1/44; H02M 7/219; H02M 1/0048; H02M 1/14; H02M 1/088; H02M 1/4208; Y02B 70/10
See application file for complete search history.

(56) References Cited

U.S. PATENT DOCUMENTS

| | | | | |
|---|---|---|---|---|
| 8,723,487 | B2* | 5/2014 | Pahlevaninezhad | ........................ H02M 3/1584 323/272 |
| 9,190,900 | B2* | 11/2015 | Carletti | ............... H02M 1/4225 |
| 10,734,888 | B1* | 8/2020 | Halberstadt | ......... H02M 1/4225 |
| 2009/0091957 | A1* | 4/2009 | Orr | ................... H02M 3/3376 363/79 |
| 2009/0256543 | A1* | 10/2009 | Yang | .................. H02M 1/0085 323/284 |
| 2010/0328969 | A1* | 12/2010 | Meyer | ................ H05B 41/2827 363/21.02 |
| 2013/0234531 | A1* | 9/2013 | Budgett | ............... H04B 5/0037 307/104 |
| 2015/0048807 | A1* | 2/2015 | Fan | ..................... H02M 1/4225 323/208 |
| 2015/0263605 | A1* | 9/2015 | Alam | ................ H02M 3/33546 363/21.02 |
| 2016/0056702 | A1* | 2/2016 | Halim | ..................... H02M 1/12 363/74 |
| 2017/0005565 | A1* | 1/2017 | Bai | .................. H02M 1/4258 |
| 2017/0005592 | A1* | 1/2017 | Yan | ................... H02M 7/53871 |
| 2017/0033706 | A1* | 2/2017 | Usami | ................ H02M 1/0085 |
| 2017/0063251 | A1 | 3/2017 | Ye et al. | |
| 2017/0196057 | A1* | 7/2017 | Han | ...................... H02M 3/337 |
| 2018/0097453 | A1 | 4/2018 | Xu et al. | |
| 2018/0205306 | A1 | 7/2018 | Huang et al. | |
| 2018/0337610 | A1 | 11/2018 | Leong et al. | |
| 2019/0044434 | A1* | 2/2019 | Elferich | .................. H02M 3/01 |
| 2019/0068058 | A1* | 2/2019 | Yanagida | .............. H02M 3/158 |
| 2019/0149086 | A1* | 5/2019 | Jin | .......................... H02J 3/388 136/244 |
| 2019/0222116 | A1 | 7/2019 | Manthe et al. | |
| 2020/0099288 | A1* | 3/2020 | Young | ................. H02M 1/4208 |
| 2020/0343811 | A1* | 10/2020 | Xiang | ................. H02M 1/4225 |
| 2020/0412236 | A1* | 12/2020 | Halberstadt | ......... H02M 1/4225 |
| 2021/0384833 | A1* | 12/2021 | Bucheru | .......... G01R 19/16538 |

FOREIGN PATENT DOCUMENTS

| | | |
|---|---|---|
| CN | 103354416 A | 10/2013 |
| CN | 103814513 A | 5/2014 |
| CN | 105247775 A | 1/2016 |
| CN | 107196499 A | 9/2017 |
| CN | 109889050 A | 6/2019 |
| CN | 110768237 A | 2/2020 |

OTHER PUBLICATIONS

Corresponding China Office Action dated Mar. 3, 2022 with its English translation. (9 pages).

Corresponding China Office Action dated Mar. 3, 2022 with its English translation. (32 pages).

* cited by examiner

US 11,569,731 B2

CONTROL METHOD FOR AN AC-DC CONVERSION CIRCUIT

CROSS-REFERENCE TO RELATED APPLICATION

This application a continuation application of U.S. patent application Ser. No. 17/199,472, filed on Mar. 12, 2021, which claims priority to Chinese Patent Application No. 202010217069.5, filed on Mar. 25, 2020. Both of the two applications are hereby incorporated by reference in their entireties.

TECHNICAL FIELD

The present disclosure relates to the technical field of power supply, and in particular, to a control method for power supply.

BACKGROUND

Recently, miniaturization and high power density have become the development trend of Switching Mode Power Supply (SMPS). In order to improve the switching frequency and the power density of the SMPS, the alternating current to direct current (AC-DC) conversion circuit is often controlled to work in critical conduction mode (CRM), because the AC-DC conversion circuit has no reverse recovery loss in the CRM. However, the switching frequency largely varies in the CRM, and limited to the driving ability of the driver chip and the loss of circuit components and magnetic parts, the switching frequency of the circuit needs to be limited to a certain range. So controlling the AC-DC conversion circuit to work in the single CRM could not meet the requirements of Total Harmonic Distortion (THD), Power Factor (PF), efficiency, and Electromagnetic Interference (EMI) characteristics at the same time.

SUMMARY

The present disclosure provides a control method for an AC-DC conversion circuit, and implements different working modes according to different input voltages and different loads, so as to improve the aspects of performance, such as THD, PF, efficiency, EMI of the AC-DC conversion circuit.

The present disclosure provides a control method, including: acquiring circuit parameter information of an AC-DC conversion circuit; and limiting an actual switching frequency or an actual switching period of the AC-DC conversion circuit in an entire load range to a preset working range according to the circuit parameter information.

BRIEF DESCRIPTION OF DRAWINGS

To describe the technical solutions in embodiments of the present disclosure or in the prior art more clearly, the following briefly introduces the accompanying drawings needed for describing the embodiments or the prior art. Apparently, the accompanying drawings in the following description illustrate merely some embodiments of the present disclosure, and persons of ordinary skill in the art may still derive other drawings from these accompanying drawings without creative effort.

DESCRIPTION OF EMBODIMENTS

To make the objectives, technical solutions, and advantages of embodiments of the present disclosure clearer, the following clearly and comprehensively describes the technical solutions in the embodiments of the present disclosure with reference to the accompanying drawings in the embodiments of the present disclosure. Apparently, the described embodiments are merely a part rather than all embodiments of the present disclosure. All other embodiments obtained by persons of ordinary skill in the art based on the embodiments of the present disclosure without creative effort shall fall within the protection scope of the present disclosure.

The terms "including" and "comprising" and any variations thereof as used herein are intended to cover nonexclusive inclusions, for example, processes, methods, systems, products or devices that contain a series of steps or units are not limited to the steps or units clearly listed, but may include other steps or units that are not explicitly listed or are inherent in these processes, methods, products, or devices.

The "an embodiment" or "another embodiment" mentioned throughout the specification of the present disclosure means that a specific feature, structure, or characteristic related to the embodiment is included in at least one embodiment of the present disclosure. Therefore, "in an embodiment" or "in the embodiment" appearing throughout the specification does not necessarily refer to the same embodiment. It should be noted that the embodiments and the features therein in the scheme can be combined with each other without conflict.

In order to solve the problem in the prior art that controlling the AC-DC conversion circuit to work in a single CRM could not meet the requirements of Total Harmonic Distortion (THD), Power Factor (PF), efficiency and Electromagnetic Interference (EMI) at the same time, the present disclosure provides a control method for the AC-DC conversion circuit, which may implement different working modes according to different input voltages and different loads, so as to improve the aspects of performance, such as THD, PF, efficiency, EMI of the PFC circuit. The implementation processes of the present disclosure are specifically described below with reference to several embodiments.

Figure 1A:
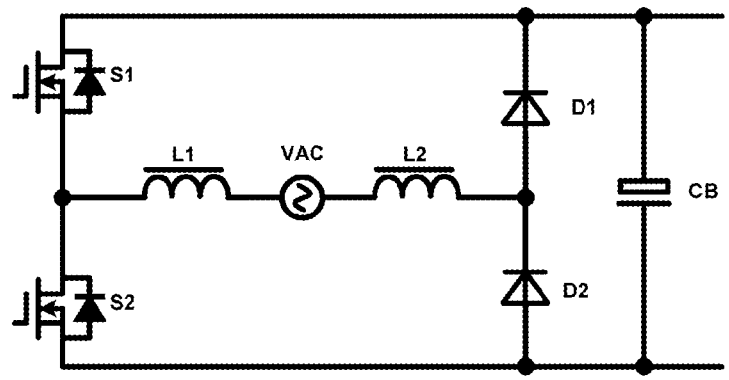
FIGS. 1A-1D are schematic structural diagrams of an AC-DC conversion circuit according to an embodiment of the present disclosure.
Figure 1B:
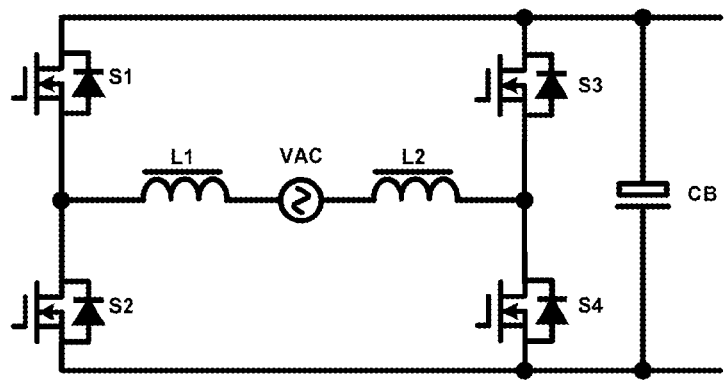
Figure 1C:
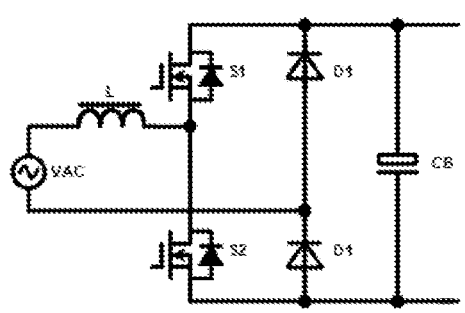
Figure 1D:
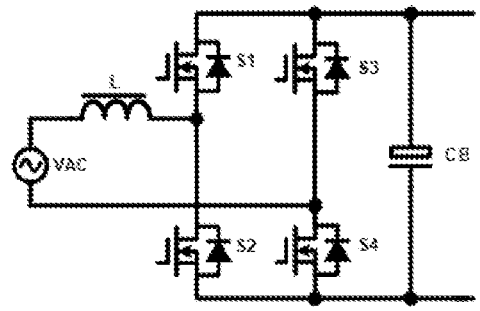

The execution subject of the present disclosure is an electronic device, which includes an AC-DC conversion circuit and a control apparatus connected to the AC-DC conversion circuit. The topology of the AC-DC conversion circuit can be a bridgeless PFC topology as shown in FIGS. 1A-1B. As shown in FIG. 1A, a first bridge arm includes two power switches S1 and S2, and a second bridge arm includes two diodes D1, D2, a midpoint of the first bridge arm is connected to a power grid through an inductor L1, and a midpoint of the second bridge arm is connected to the power grid through an inductor L2. As shown in FIG. 1B, a first bridge arm includes two power switches S1, S2, and a second bridge arm includes two power switches S3 and S4, a midpoint of the first bridge arm is connected to the power grid through the inductor L1, and a midpoint of the second bridge arm is connected to the power grid through an inductor L2. In the above embodiments, the bridgeless PFC has two inductors L1 and L2. In some other embodiments, the bridgeless PFC may only have one inductor as shown in FIGS. 1C-1D, which is not limited in the present disclosure. Further, the control apparatus controls the power switches S1 and S2 in the AC-DC conversion circuit shown in FIG. 1A, or controls the power switches S1-S4 in the AC-DC conversion circuit shown in FIG. 1B. In some other embodiments, the AC-DC conversion circuit may also adopt other topologies, which is not limited in the present disclosure.

The electronic device of the present disclosure may be applied to a power supply device in the electrical appliance or the terminal device. The present disclosure provides a control method for the AC-DC conversion circuit, by calculating working information of an AC-DC conversion circuit according to the input information and the output information of the AC-DC conversion circuit, and comparing the working information of the AC-DC conversion circuit with a preset working range, to obtain an actual working information of the AC-DC conversion circuit. Wherein, the input information includes an input voltage and an input current, the output information includes an output voltage and an output current, and the working information includes a switching frequency or a switching period. Through the preset working range, the working information of the AC-DC conversion circuit can be adjusted to meet the requirements of Total Harmonic Distortion (THD), Power Factor (PF), efficiency and Electromagnetic Interference (EMI) and the like.

Figure 2:
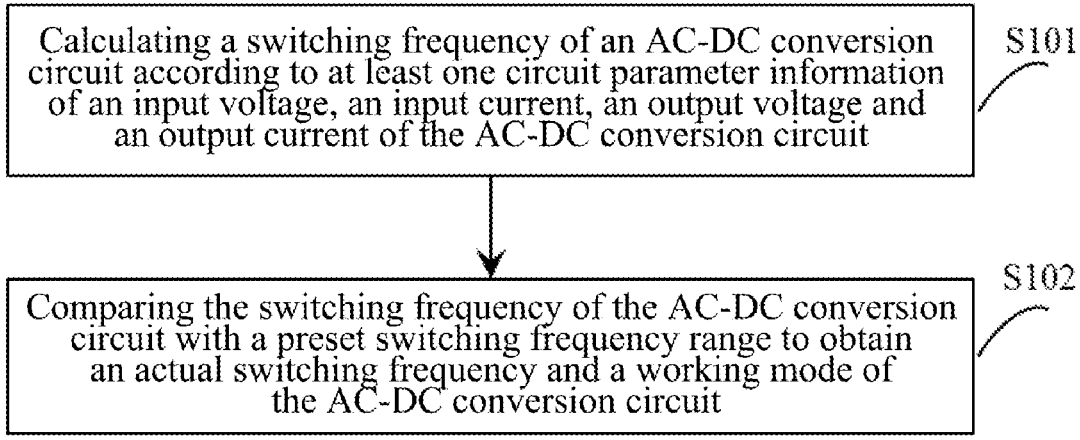
FIG. 2 is a schematic flowchart of a control method for an AC-DC conversion circuit according to an embodiment of the present disclosure.

FIG. 2 is a schematic flowchart of a control method for the AC-DC conversion circuit according to an embodiment of the present disclosure. Referring to FIG. 2, the method includes:

S101: calculating a switching frequency of the AC-DC conversion circuit according to at least one circuit parameter information of an input voltage, an input current, an output voltage and an output current of the AC-DC conversion circuit.

Since the switching frequency is reciprocal with the switching period, the switching period of the AC-DC conversion circuit may also be calculated according to at least one circuit parameter information of an input voltage, an input current, an output voltage and an output current of the AC-DC conversion circuit.

It should be understood that in the present disclosure, one or a combination of any two or more of multiple parameters such as the input voltage, the input current, the output voltage and the output current of the AC-DC conversion circuit can be used to calculate the switching frequency of the AC-DC conversion circuit.

In some embodiments, the switching frequency can be calculated by the following formula:

$$F(V_{in}, I_{in}, V_o, I_o) = \frac{V_{in}(V_o - \sqrt{2}\,V_{in}|\sin(2\pi ft)|)}{2I_{in}I_o L V_o^2}$$

Wherein, Vin is the input voltage, Iin is the input current, Vo is the output voltage, Io is the output current, and L is inductance value of the inductor. It should be noted that the calculation of the switching frequency is not limited to this.

S102: comparing the switching frequency of the AC-DC conversion circuit with a preset switching frequency range to obtain an actual switching frequency and a working mode of the AC-DC conversion circuit.

For example, the calculated switching frequency of the AC-DC conversion circuit is compared with the preset switching frequency range to obtain the actual switching frequency of the AC-DC conversion circuit; or the calculated switching period of the AC-DC conversion circuit is compared with a preset switching period range to obtain the actual switching period of the AC-DC conversion circuit.

Wherein, an upper limit and a lower limit of a preset working range in the embodiment may be preset fixed values, or both may be variable values that vary with a variable, such as the input voltage or a working time or a working phase. Specifically, an upper limit and a lower limit of the switching frequency range may be preset fixed values, or both may be variable values that vary with a variable, such as the input voltage or the working time or the working phase. Correspondingly, an upper limit and a lower limit of the switching period range may be preset fixed values, or both may be variable values that vary with a variable, such as the input voltage or the working time or the working phase.

Further, in some embodiments, the control method includes: comparing the working information of the AC-DC conversion circuit with the preset working range, so as to determine the working mode of the AC-DC conversion circuit, and drive the AC-DC conversion circuit to work in the corresponding working mode.

Exemplarily, the working mode includes one or more of the following: Continuous Conduction Mode (CCM), Critical Conduction Mode (CRM) and Discontinuous Conduction Mode (DCM).

If the switching frequency is greater than or equal to a maximum frequency threshold, the working mode of the AC-DC conversion circuit is controlled to be DCM or CCM, and the actual switching frequency of the AC-DC conversion circuit is controlled to be the maximum frequency threshold, wherein the maximum frequency threshold is the upper limit of the preset switching frequency range. Wherein, in a condition that the DCM is selected while the switching frequency is greater than or equal to the maximum frequency threshold, a better PF is obtained by changing a charging time, meanwhile, a driving loss is reduced by limiting the maximum frequency, which is convenient for the selection of circuit components and magnetic parts. In a condition that the CCM is selected while the switching frequency is greater than or equal to the maximum frequency threshold, a ZVS can be realized, thereby reducing switching loss, meanwhile, the driving loss is reduced by limiting the maximum frequency, which is convenient for the selection of circuit components and magnetic parts.

Figure 3A:
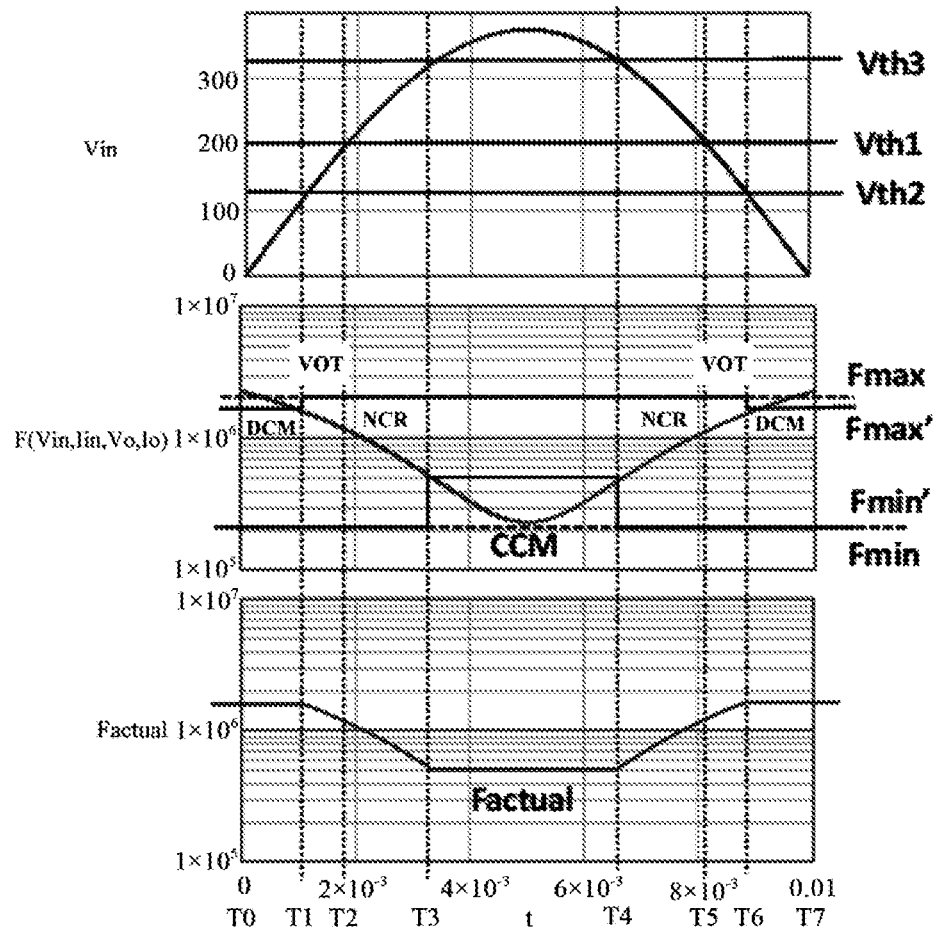
FIGS. 3A-3B are schematic diagrams of a control method for an AC-DC conversion circuit according to a first embodiment of the present disclosure.
Figure 3B:
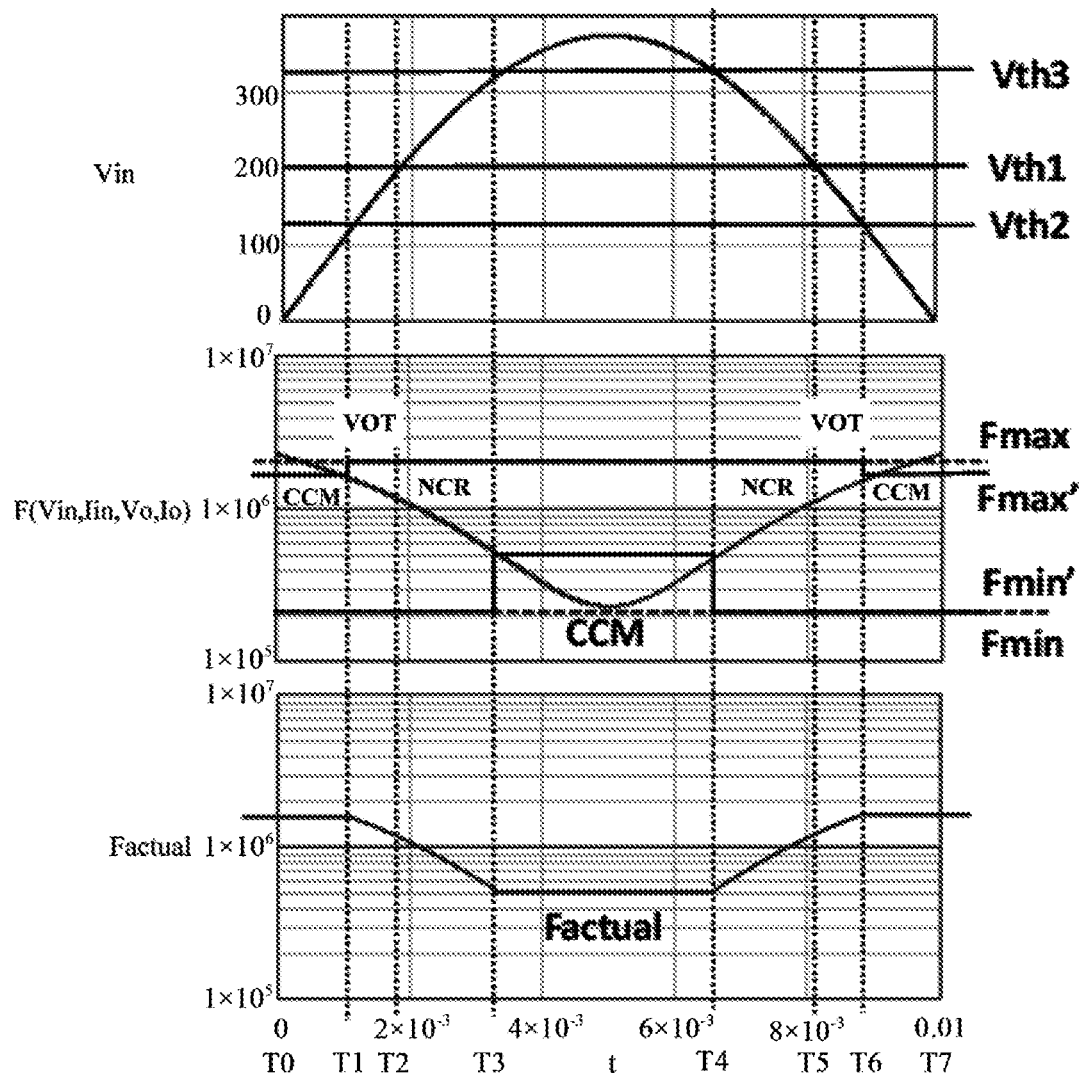
Figure 4:
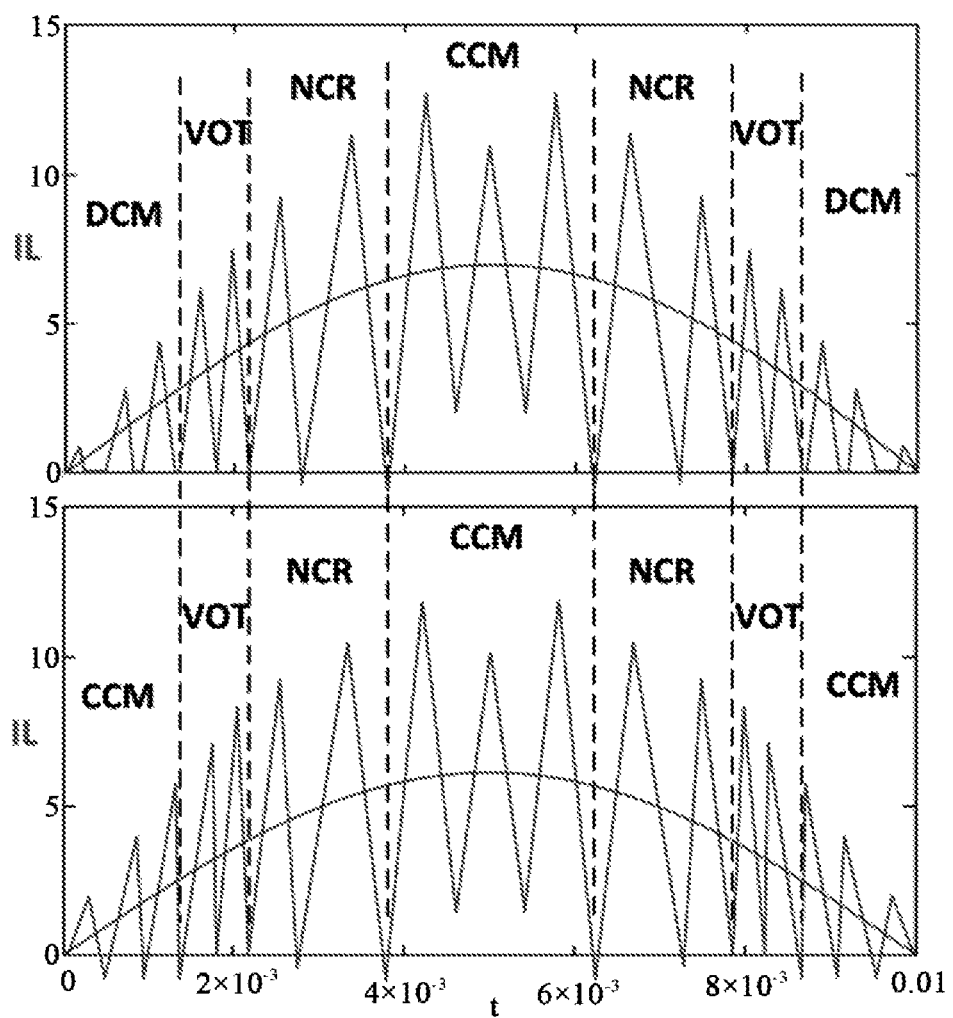
FIG. 4 is a schematic waveform diagram of an inductor current in an AC-DC conversion circuit in different modes according to the embodiment.

FIGS. 3A-3B are schematic diagrams of a control method for the AC-DC conversion circuit according to a first embodiment of the present disclosure. Referring to FIGS. 3A-3B, the switching frequency F(Vin, Iin, Vo, Io) is calculated according to input voltage Vin, the input current Iin, the output voltage Vo and the output current Io, and F(Vin, Iin, Vo, Io) is compared with the preset switching frequency range. During time periods T0-T1 and T6-T7, the switching frequency F(Vin, Iin, Vo, Io) is greater than or equal to the maximum frequency threshold Fmax, then the working mode of the AC-DC conversion circuit is controlled to the DCM, as shown in FIG. 3A and FIG. 4; or the working mode of the bridgeless PFC circuit is controlled to be the CCM, as shown in FIG. 3B and FIG. 4. And the actual switching frequency Factual is equal to the maximum frequency threshold Fmax during the time periods T0-T1 and T6-T7.

Limiting the actual switching frequency of the bridgeless PFC lower than the maximum frequency threshold can reduce the driving loss and facilitate the selection of circuit components or magnetic parts, meanwhile, in the DCM working mode, a better PF can be obtained by changing the charging time, and in the CCM working mode, ZVS can be realized, thereby reducing the switching loss.

If the switching frequency is less than or equal to a minimum frequency threshold, the working mode of the AC-DC conversion circuit is controlled to be the CCM, and the actual switching frequency of the AC-DC conversion circuit is controlled to be the minimum frequency threshold, wherein the minimum frequency threshold is the lower limit of the preset switching frequency range.

For example, as shown in FIGS. 3A-3B, during the time period T3-T4, the switching frequency F(Vin, Iin, Vo, Io) is less than or equal to the minimum frequency threshold Fmin, then the working mode of the bridgeless PFC circuit is controlled to be the CCM, so that the switching frequency Factual is equal to the minimum frequency threshold Fmin during the time period T3-T4.

In the CCM working mode, by selecting different switching frequencies, the actual switching frequency of the bridgeless PFC is limited to be not less than the minimum frequency threshold, which can reduce a current ripple, improve efficiency, and facilitate EMI design.

It should be noted that the CCM with the switching frequency being less than or equal to the minimum frequency threshold Fmin is different from the CCM with the switching frequency being greater than or equal to the maximum frequency threshold Fmax, as shown in FIG. 4. A current of the CCM adopted in a condition that the switching frequency F(Vin, Iin, Vo, Io) is less than or equal to the minimum frequency threshold Fmin is continuous, and a current of the CCM adopted in a condition that the switching frequency F(Vin, Iin, Vo, Io) is greater than or equal to the maximum frequency threshold Fmax is continuous and there is a negative current.

If the switching frequency is less than the maximum frequency threshold but greater than the minimum frequency threshold, the working mode of the AC-DC conversion circuit is controlled to be the CRM. For example, as shown in FIGS. 3A-3B, during time periods T1-T3 and T4-T6, in a condition that the switching frequency F(Vin, Iin, Vo, Io) is between the minimum frequency threshold Fmin and the maximum frequency threshold Fmax, the working mode of the bridgeless PFC circuit is controlled to be the CRM, so that the actual switching frequency Factual is equal to the calculated switching frequency F(Vin, Iin, Vo, Io) during the time periods T1-T3 and T4-T6.

In some embodiment, if the AC-DC conversion circuit works in the CRM, the present disclosure further determines a control mode of the AC-DC conversion circuit, for example Variable On-time Critical Conduction Mode (VOT CRM) and Negative Current Critical Conduction Mode (NCR CRM). Wherein, the Negative Current Critical Conduction Mode is similar to a Triangular Conduction Mode (TCM), that is, the current will be negative on the basis of the Critical Conduction Mode.

Furthermore, in some embodiments, the control method in CRM may include the following three different implementations:

First Embodiment

Determining the control logic according to an absolute value of the input voltage and a first voltage threshold Vth1; when the absolute value of the input voltage is less than or equal to the first voltage threshold, controlling the AC-DC conversion circuit to work in the VOT CRM to change the charging time of the inductor in the AC-DC conversion circuit; when the absolute value of the input voltage is greater than the first voltage threshold, controlling the AC-DC conversion circuit to work in the NCR CRM, to control the inductor current to reach a negative value to realize zero voltage switching ZVS of power switches.

As shown in FIGS. 3A, 3B and 4, during time periods of T1-T2 and T5-T6, the absolute value of the input voltage Vin is less than or equal to the first voltage threshold Vth1, and then the working mode of the AC-DC conversion circuit is controlled to be the VOT CRM. By changing the charging time of the inductor in the AC-DC conversion circuit, the THD of the input current when the input voltage Vin cross zero is improved, which avoids the problem of high input current THD caused by the average input current being zero when the AC-DC conversion circuit works in the TCM or the CRM near the zero-crossing point of the input voltage.

As shown in FIGS. 3A, 3B and 4, during time periods T2-T3 and T4-T5, the absolute value of the input voltage Vin is greater than the first voltage threshold Vth1, and then the working mode of the AC-DC conversion circuit is controlled to be the NCR CRM, and the inductor current in the AC-DC conversion circuit is controlled to reach a negative value to realize the ZVS of the power switches, thereby reducing the switching loss.

Second Embodiment

Determining the control logic according to a working time and a first time threshold Tth1. Within half a power frequency period, the switching frequency range Fmin and Fmax, and the actual switching frequency are symmetrical with the time Tc as the axis, that is, the latter quarter period is symmetrical with the former quarter period, which is specifically shown in FIG. 5A or 5B.

When the working time is less than or equal to the first time threshold Tth1, the AC-DC conversion circuit is controlled to work in the VOT CRM, and the charging time of the inductor in the AC-DC conversion circuit can be changed. When the working time is greater than the first time threshold Tth1, the AC-DC conversion circuit is controlled to work in the NCR CRM, and the inductor current to can reach a negative value to realize the ZVS of the power switches.

Third Embodiment

Determining the control logic according to a working phase and a first phase threshold Φth1. Within half a power frequency period, the switching frequency range Fmin and Fmax, and the actual switching frequency are symmetrical with the time Tc as the axis, that is, the latter quarter period is symmetrical with the former quarter period, which is specifically shown in FIG. 6A or 6B.

When the working phase is less than or equal to the first phase threshold Φth1, the AC-DC conversion circuit is controlled to work in the VOT CRM, and the charging time of the inductor in the AC-DC conversion circuit can be changed. When the working phase is greater than the first phase threshold Φth1, the AC-DC conversion circuit is controlled to work in the NCR CRM, and the inductor current can reach a negative value to realize the ZVS of the power switches.

The implementation principles and technical effects of second embodiment and third embodiment are similar to first embodiment, and will not be repeated here. The first time threshold Tth1 and the first phase threshold Φth1 may be directly set according to the theoretical situation, or may be set by perform an operation such as phase locking according to sampled input voltage or input current, which is not limited in the present disclosure.

In the present disclosure, the working information of the AC-DC conversion circuit can also be the switching period. Therefore, the control method may include:

Comparing the switching period of the AC-DC conversion circuit with the preset switching period range to obtain the actual switching period of the AC-DC conversion circuit.

In a condition that the switching period is less than or equal to a minimum period threshold Tmin, controlling the AC-DC conversion circuit to work in the DCM or the CCM, and controlling the actual switching period of the AC-DC conversion circuit to be the minimum period threshold Tmin, wherein the minimum period threshold is the lower limit of the preset switching period range. The AC-DC conversion circuit may work in the DCM, which has the advantages of low driving loss and high PF, meanwhile, a maximum switching frequency of the bridgeless PFC is limited by limiting a minimum switching period thereof, which is convenient for the selection of circuit components and magnetic parts. The bridgeless PFC may work in the CCM, the ZVS can be realized, thereby reducing the switching loss, meanwhile, the driving loss is reduced by limiting the maximum frequency, which is convenient for the selection of circuit components and magnetic parts.

In a condition that the switching period is greater than or equal to a maximum period threshold Tmax, controlling the AC-DC conversion circuit to work in the CCM, and controlling the actual switching period of the AC-DC conversion circuit to be the maximum period threshold Tmax, wherein the maximum period threshold is the upper limit of the preset switching period range. The AC-DC conversion circuit works in the CCM, which has the advantages of small current ripple, high efficiency, good THD and EMI.

In a condition that the switching period is less than the maximum period threshold but greater than the minimum period threshold, controlling the AC-DC conversion circuit works in the CRM. The AC-DC conversion circuit works in the CRM, which can realize ZVS by a negative current to reduce the switching loss, or improve the THD of the input current when the input voltage crossing zero by changing the charging time of the inductor.

Due to the reciprocal relationship between the switching frequency and the switching period, the switching frequency is greater than or equal to the maximum frequency threshold F≥F$_{max}$, so it can be deduced that $$\frac{1}{F} \leq \frac{1}{F_{max}},$$

that is the switching period is less than or equal to the minimum period threshold T≤T$_{min}$, and the minimum period threshold Tmin is equal to a reciprocal of the maximum frequency threshold Fmax. Correspondingly, the switching frequency is less than or equal to the minimum frequency threshold F≤F$_{min}$, so it can be deduced that $$\frac{1}{F} \geq \frac{1}{F_{min}},$$

that is the switching period is greater than or equal to the maximum period threshold T≥T$_{max}$, and the maximum period threshold Tmax is equal to the reciprocal of the minimum frequency threshold Fmin. Therefore, the control method according to the switching frequency in the present disclosure may derive that the control method according to the switching period, the control method according to the period, and the control method according to the frequency correspond to each other, which may not be further described here, and they all belong to the protection scope of the present disclosure.

In some embodiments, in a condition that the switching frequency is greater than or equal to the maximum frequency threshold, in addition to control the AC-DC conversion circuit to work in the DCM or the CCM, the AC-DC conversion circuit can also be controlled to work in the VOT CRM, and then it may not be necessary to fix the switching frequency to the maximum frequency threshold. In practice, the AC-DC conversion circuit may be controlled by calculating a turn-on time according to at least one of the input voltage, the output voltage and other information.

Taking the switching frequency as an example, in the present disclosure, the upper limit of the switching frequency range is the maximum frequency threshold, and the lower limit of the switching frequency range is the minimum frequency threshold, which may be fixed values, or both may be variable values that vary with the input voltage or the working time or the working phase. Exemplarily, the maximum frequency threshold and the minimum frequency threshold are corrected according to at least one variable of the absolute value of the input voltage, the working time and the working phase of the AC-DC converter circuit, which includes but not limited to the following three specific implementations.

From first aspect, the maximum frequency threshold and the minimum frequency threshold are corrected according to the absolute value of the input voltage and at least one voltage correction threshold. The number of voltage correction thresholds can be set differently according to different actual circuit designs and different application scenarios, which is not limited in the present disclosure.

Taking a case in which two voltage correction thresholds are set as an example to explain the present disclosure. As shown in FIG. 3A, a first voltage correction threshold Vth2 and a second voltage correction threshold Vth3 are preset. The present disclosure corrects the maximum frequency threshold Fmax and the minimum frequency threshold Fmin of the switching frequency range by comparing the absolute value of the input voltage with the first voltage correction threshold Vth2 and the second voltage correction threshold Vth3, so that the switching frequency range varies with the absolute value of the input voltage.

During the time period that the absolute value of the input voltage Vin is less than or equal to the first voltage correction threshold Vth2 (the time periods T0-T1 and T6-T7 as shown in FIG. 3A), the maximum frequency threshold Fmax is corrected to a maximum correction threshold Fmax', wherein the maximum correction threshold Fmax' is less than the maximum frequency threshold Fmax. Reducing the maximum frequency threshold can reduce the driving loss, and facilitate the selection of circuit components and magnetic parts at the same time.

During the time period that the absolute value of the input voltage Vin is greater than the first voltage correction threshold Vth2 (the time period T1-T6 as shown in FIG. 3A), the maximum frequency threshold Fmax is kept unchanged.

During the time period that the absolute value of the input voltage Vin is greater than or equal to the second voltage correction threshold Vth3 (the time period T3-T4 as shown in the FIG. 3A), the minimum frequency threshold Fmin is corrected to a minimum correction threshold Fmin', wherein the minimum correction threshold Fmin' is greater than the minimum frequency threshold Fmin. Increasing the minimum frequency threshold can reduce the inductance current ripple, facilitate EMI design and improve efficiency.

During the time period that the absolute value of the input voltage Vin is less than the second voltage correction threshold Vth3 (the time periods T0-T3 and T4-T7 as shown in the FIG. 3A), the minimum frequency threshold is kept unchanged.

From second aspect, the maximum frequency threshold and the minimum frequency threshold are corrected according to the working time and at least one time correction threshold. The number of time correction thresholds can be set differently according to different actual circuit designs and different application scenarios, which is not limited in the present disclosure.

Figure 5A:
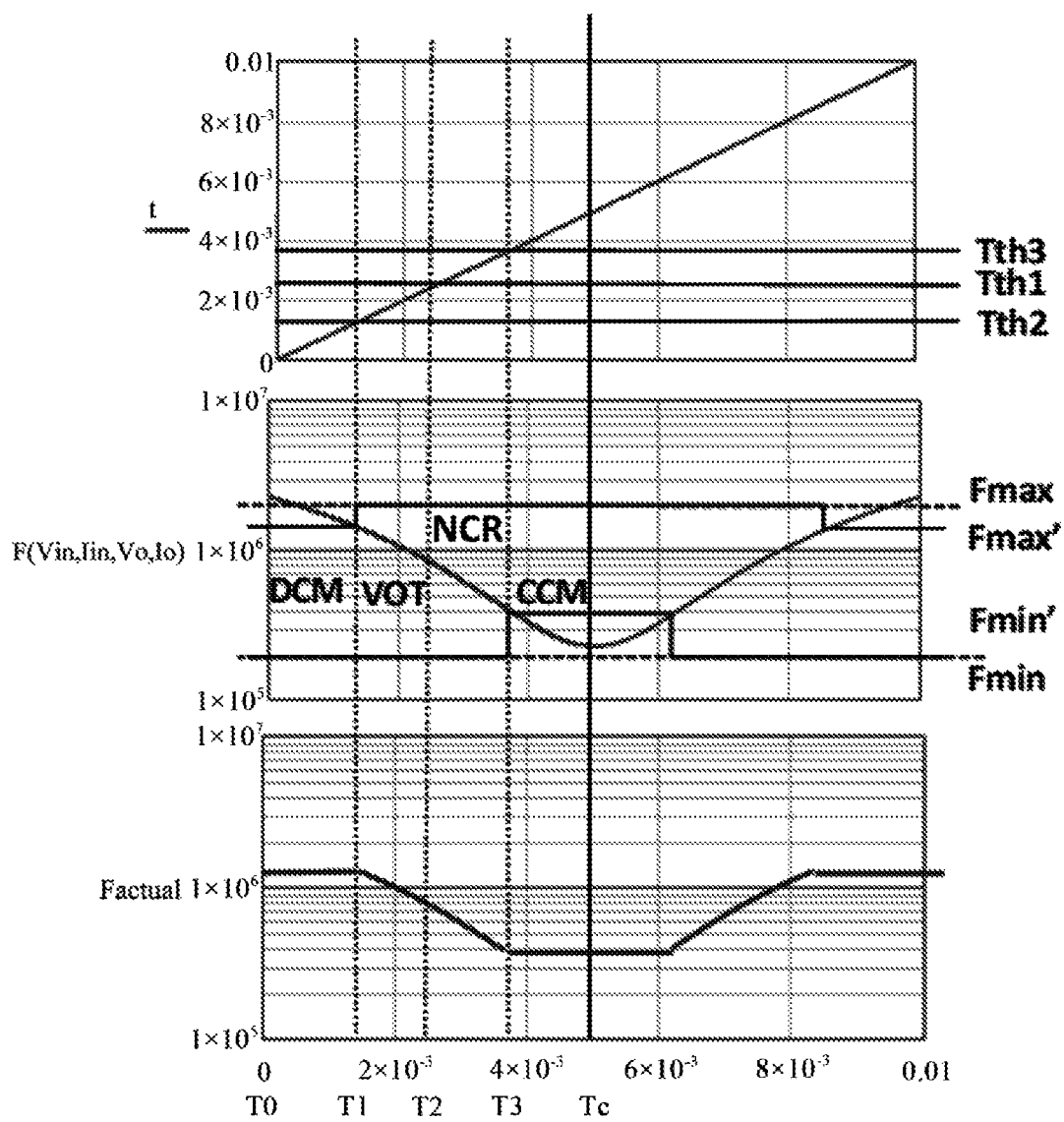
FIGS. 5A-5B are schematic diagrams of a control method for an AC-DC conversion circuit according to a second embodiment of the present disclosure.
Figure 5B:
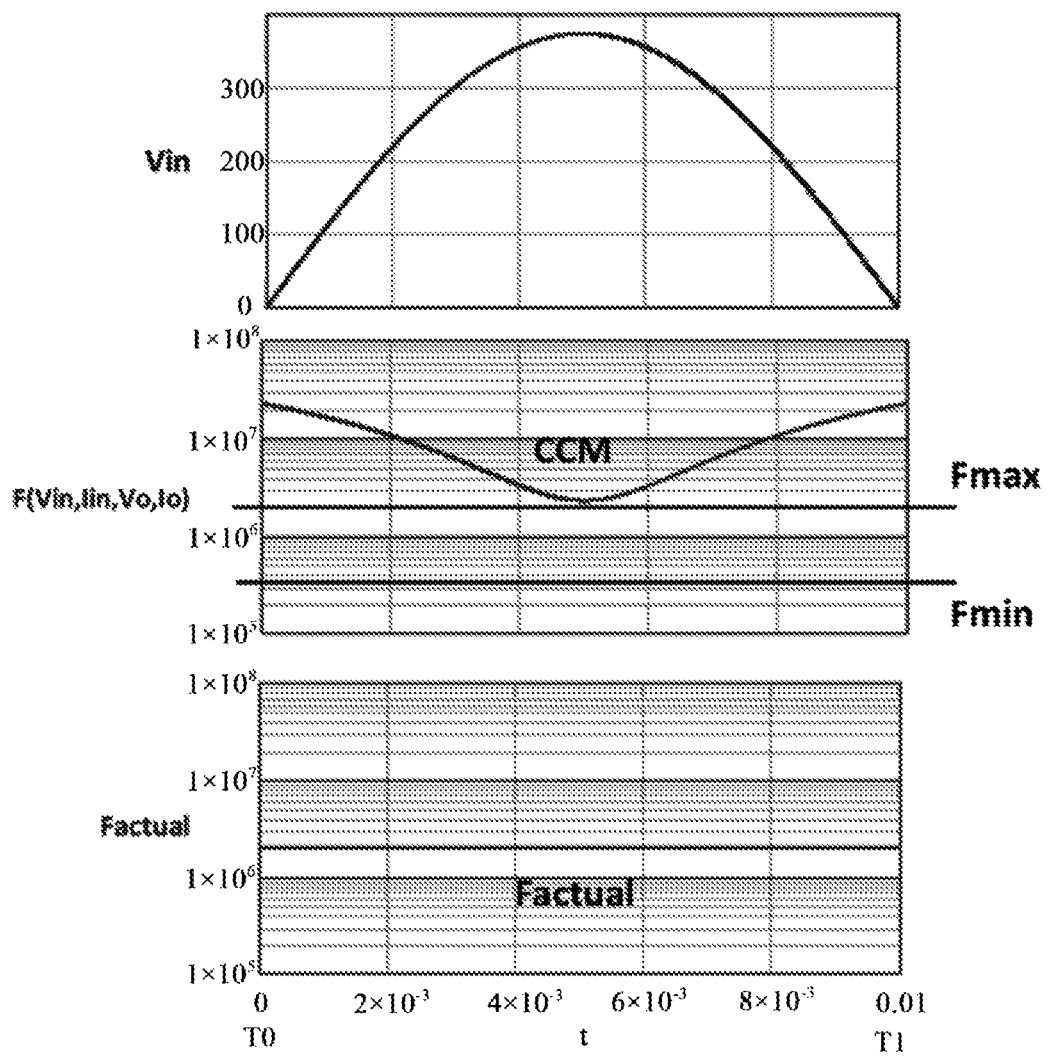

FIGS. 5A-5B are schematic diagrams of an AC-DC conversion circuit control method according to a second embodiment of the present disclosure. As shown in the FIGS. 5A-5B, a first time correction threshold Tth2 and a second time correction threshold Tth3 are preset. The present disclosure corrects the maximum frequency threshold Fmax and the minimum frequency threshold Fmin of the switching frequency range by comparing the working time t with the first time correction threshold Tth2 and the second time correction threshold Tth3, so that the switching frequency range varies with the working time.

During the time period that the working time t is less than or equal to the first time correction threshold Tth2 (such as the time period T0-T1), the maximum frequency threshold Fmax is corrected to the maximum correction threshold Fmax', wherein the maximum correction threshold Fmax' is less than the maximum frequency threshold Fmax. Reducing the maximum frequency threshold can reduce the driving loss, and facilitate the selection of circuit components and magnetic parts at the same time.

During the time period that the working time t is greater than the first time correction threshold Tth2 (such as the time period T1-Tc), the maximum frequency threshold Fmax is kept unchanged.

During the time period that the working time is greater than or equal to the second time correction threshold Tth3 (such as the time period T3-Tc), the minimum frequency threshold Fmin is corrected to the minimum correction threshold Fmin', wherein the minimum correction threshold Fmin' is greater than the minimum frequency threshold Fmin. Increasing the minimum frequency threshold can reduce the inductance current ripple, facilitate EMI design and improve efficiency.

During the time period that the working time t is less than the second time correction threshold Tth3 (such as the time period T0-T3), the minimum frequency threshold Fmin is kept unchanged.

Further, after the switching frequency range is corrected, the working mode of the AC-DC conversion circuit may be determined according to the method provided in any of the foregoing embodiments. For example, during the time period T0-T1, the switching frequency F is greater than Fmax', the actual switching frequency Factual is equal to Fmax', and the AC-DC conversion circuit may work in the DCM as shown in FIG. 5A, or the AC-DC conversion circuit may work in the CCM as shown in FIG. 5B. During the time period T3-Tc, the switching frequency F is less than Fmin', the actual switching frequency Factual is equal to Fmin', and the AC-DC conversion circuit works in the CCM. During the time period T1-T3, the switching frequency F is greater than Fmin' but less than Fmax', and the AC-DC conversion circuit works in the CRM. Further, the control logic of the circuit in the CRM is determined by comparing the working time t with the first time threshold Tth1. For example, during the time period T1-T2, the working time t is less than the time threshold Tth1, then the AC-DC conversion circuit works in the VOT CRM; during the time period T2-T3, the working time t is greater than the first time threshold Tth1, then the AC-DC conversion circuit works in the NCR CRM. Within half a power frequency period, the latter quarter period and the former quarter period are symmetrical with the time Tc as the axis, which is not repeated here.

From third aspect, the maximum frequency threshold and the minimum frequency threshold are corrected according to the working phase and at least one phase correction threshold. The number of phase correction thresholds can be set differently according to different actual circuit designs and different application scenarios, which is not limited in the present disclosure.

Figure 6A:
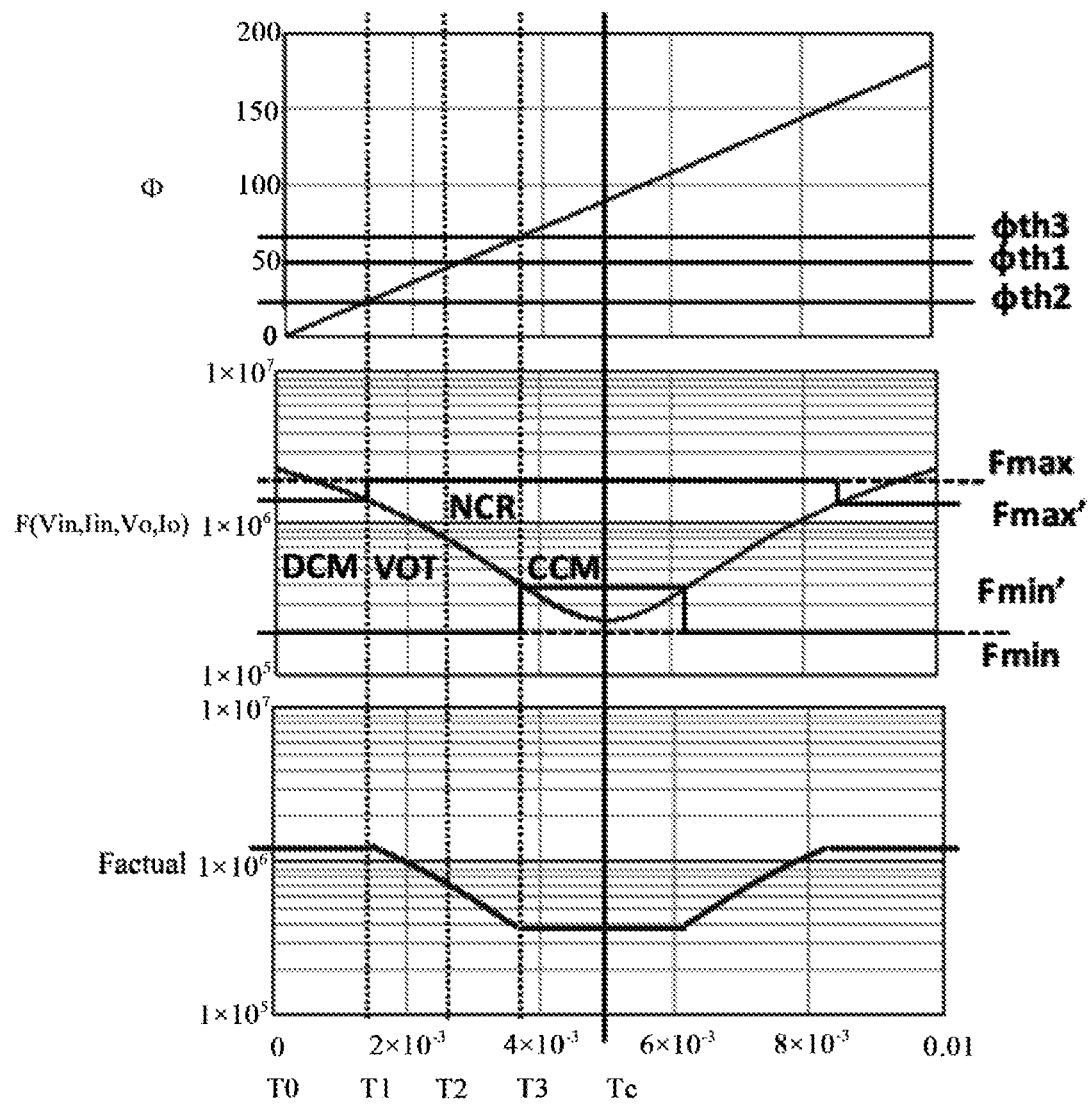
FIGS. 6A-6B are schematic diagrams of a control method for an AC-DC conversion circuit according to a third embodiment of the present disclosure.
Figure 6B:
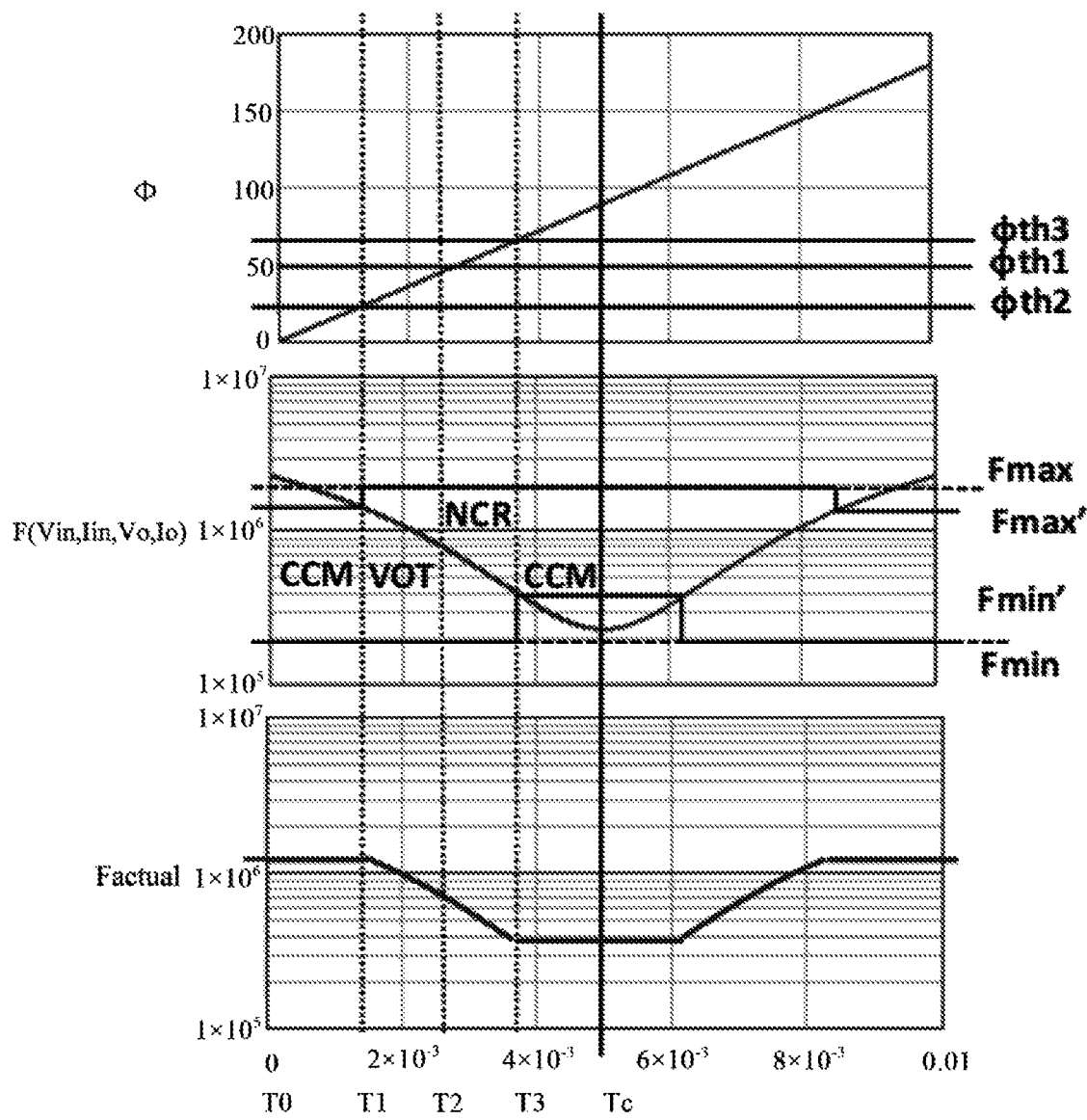

FIGS. 6A-6B are schematic diagrams of an AC-DC conversion circuit control method according to a third embodiment of the present disclosure. As shown in the FIGS. 6A-6B, a first phase correction threshold $\Phi th2$ and a second time correction threshold $\Phi th3$ are preset, and the maximum frequency threshold Fmax and the minimum frequency threshold Fmin of the switching frequency range are corrected by comparing the working phase $\Phi$ with the first phase correction threshold $\Phi th2$ and the second phase correction threshold $\Phi th3$, so that the switching frequency range varies with the working phase.

During the time period that the working phase $\Phi$ is less than or equal to the first phase correction threshold $\Phi th2$ (such as the time period T0-T1), the maximum frequency threshold Fmax is corrected to the maximum correction threshold Fmax', wherein the maximum correction threshold Fmax' is less than the maximum frequency threshold Fmax. Reducing the maximum frequency threshold can reduce the driving loss, and facilitate the selection of circuit components and magnetic parts at the same time.

During the time period that the working phase $\Phi$ is greater than the first phase correction threshold $\Phi th2$ (such as the time period T1-Tc), the maximum frequency threshold Fmax is kept unchanged.

During the time period that the working phase $\Phi$ is greater than or equal to the second phase correction threshold $\Phi th3$ (such as the time period T3-Tc), the minimum frequency threshold Fmin is corrected to the minimum correction threshold Fmin', wherein the minimum correction threshold Fmin' is greater than the minimum frequency threshold Fmin'. Increasing the minimum frequency threshold can reduce the inductance current ripple, facilitate EMI design and improve efficiency.

During the time period that the working phase $\Phi$ is less than the second phase correction threshold $\Phi th3$ (such as the time period T0-T3), the minimum frequency threshold Fmin is kept unchanged.

Further, after the switching frequency range is corrected, the working mode of the AC-DC conversion circuit may be determined according to the method provided in any of the foregoing embodiments. For example, during the time period T0-T1, the switching frequency F is greater than Fmax', the actual switching frequency Factual is equal to Fmax', and the AC-DC conversion circuit may work in the DCM as shown in FIG. 6A, or the AC-DC conversion circuit may work in the CCM as shown in FIG. 6B. During the time period T3-Tc, the switching frequency F is less than Fmin', the actual switching frequency Factual is equal to Fmin', and the AC-DC conversion circuit may work in the CCM. During the time period T1-T3, the switching frequency F is greater than Fmin' but less than Fmax', and the AC-DC conversion circuit may work in the CRM. Further, the control logic of the circuit in the CRM is determined by comparing the working phase $\Phi$ with the first phase threshold $\Phi th1$. For example, during the time period T1-T2, the working phase t is less than the phase threshold $\Phi th1$, then the AC-DC conversion circuit works in the VOT CRM; during the time period T2-T3, the working phase t is greater than the first phase threshold $\Phi th1$, then the AC-DC conversion circuit works in the NCR CRM.

Figure 7:
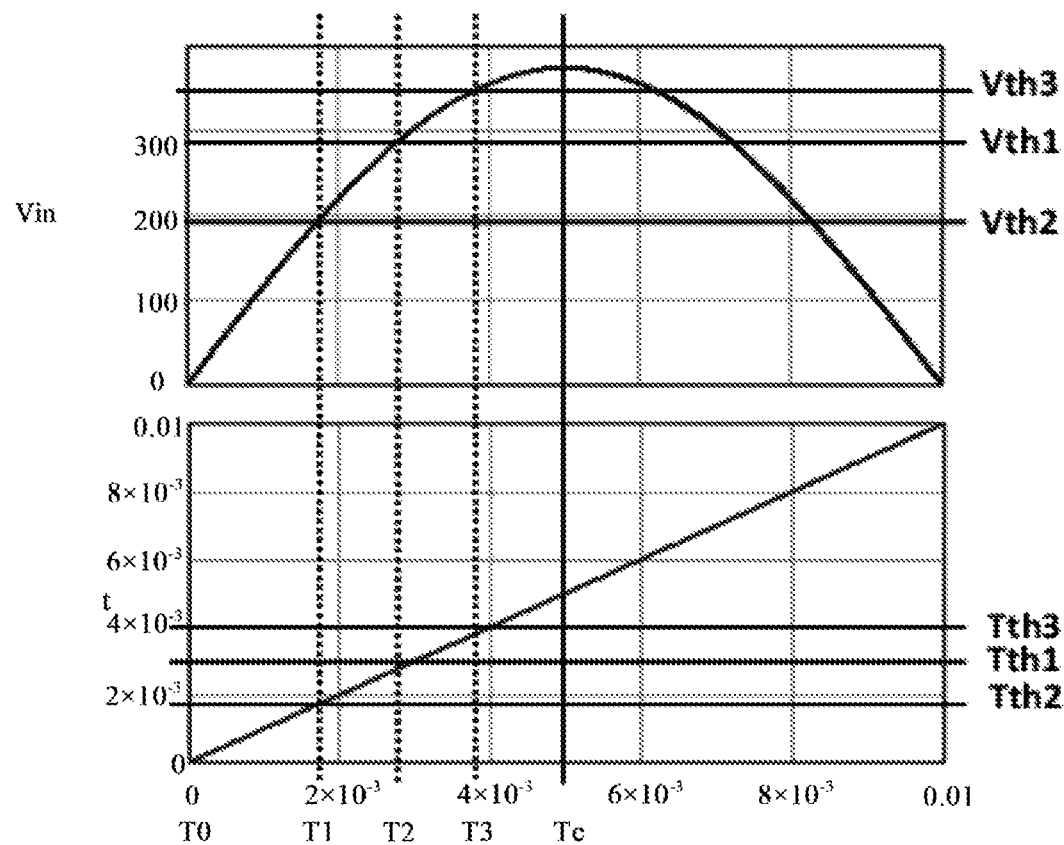
FIG. 7 is a schematic diagram of a control method for an AC-DC conversion circuit according to a fourth embodiment of the present disclosure.
Figure 8:
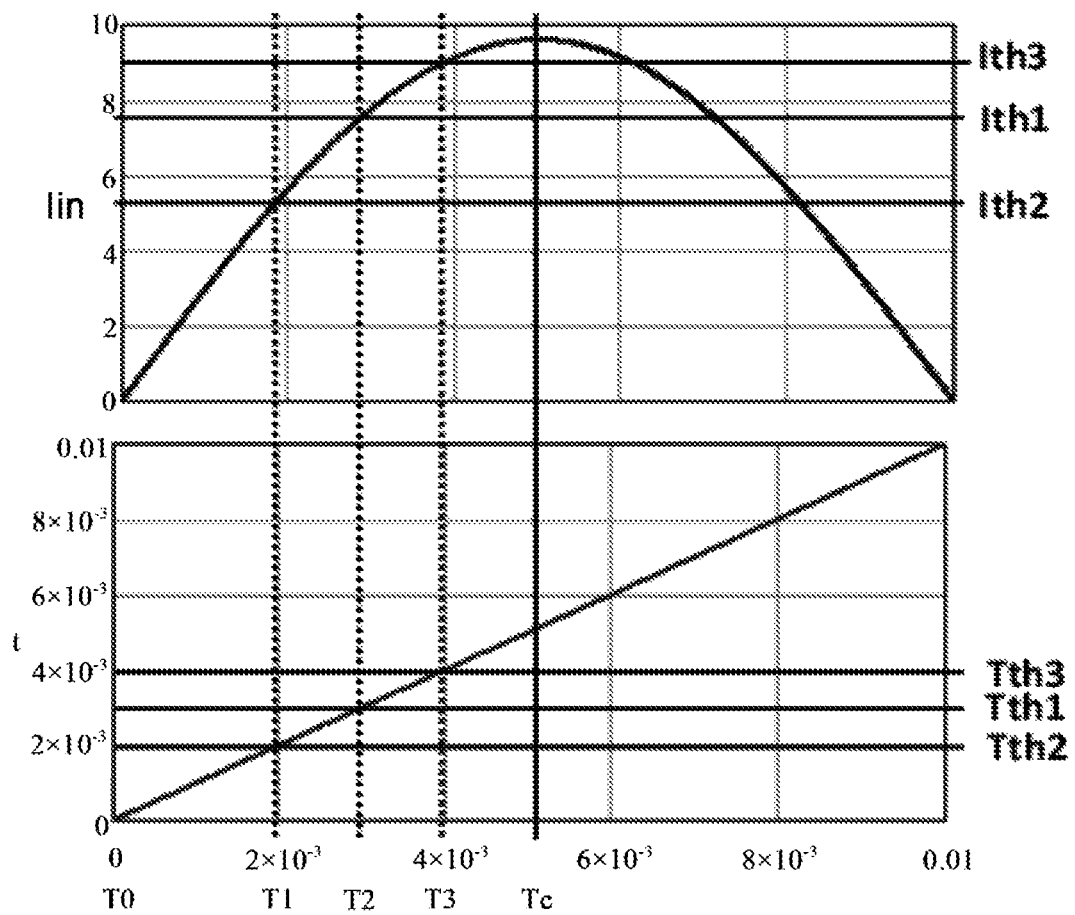
FIG. 8 is a schematic diagram of a control method for an AC-DC conversion circuit according to a fifth embodiment of the present disclosure.

The time threshold in the above embodiment may be directly set, or may be set according to the input current and at least one current threshold, or according to the input voltage and at least one voltage threshold. As shown in FIG. 7 or FIG. 8, where FIG. 7 is a schematic diagram of a control method for the AC-DC conversion circuit according to a fourth embodiment of the present disclosure, and FIG. 8 is a control method for the AC-DC conversion circuit according to a fifth embodiment of the present disclosure.

Referring to FIG. 7, at least one voltage threshold is set, and there is no limit to the number and value of the at least one voltage threshold. For example, the voltage threshold is set as Vth1, Vth2 and Vth3, and the time thresholds Tth1, Tth2 and Tth3 are obtained by comparing the absolute value of the input voltage Vin with the voltage threshold.

Specifically, at the moment T1, the absolute value of the input voltage Vin is equal to the voltage threshold Vth2, and the working time corresponds to the time threshold Tth2 at this time; at the moment T3, the absolute value of the input voltage Vin is equal to the voltage threshold Vth3, and the working time corresponds to the time threshold Tth3 at this time; and at the moment T2, the absolute value of the input voltage Vin is equal to the voltage threshold Vth1, and the working time corresponds to the time threshold Tth1 at this time.

Referring to FIG. 8, at least one current threshold is set, and there is no limit to the number and value of the at least one current threshold. For example, the current threshold is set as Ith1, Ith2 and Ith3, and the time thresholds Tth1, Tth2 and Tth3 are obtained by comparing the absolute value of input current Iin with the current threshold.

Specifically, at the moment T1, the absolute value of the input current Iin is equal to the current threshold Ith2, and the working time corresponds to the time threshold Tth2 at this time; at the moment T3, the absolute value of the input current tin is equal to the current threshold Ith3, and the working time corresponds to the time threshold Tth3 at this time; and at the moment T2, the absolute value of the input current Iin is equal to the current threshold Ith1, and the working time corresponds to the time threshold Tth1 at this time.

Figure 9:
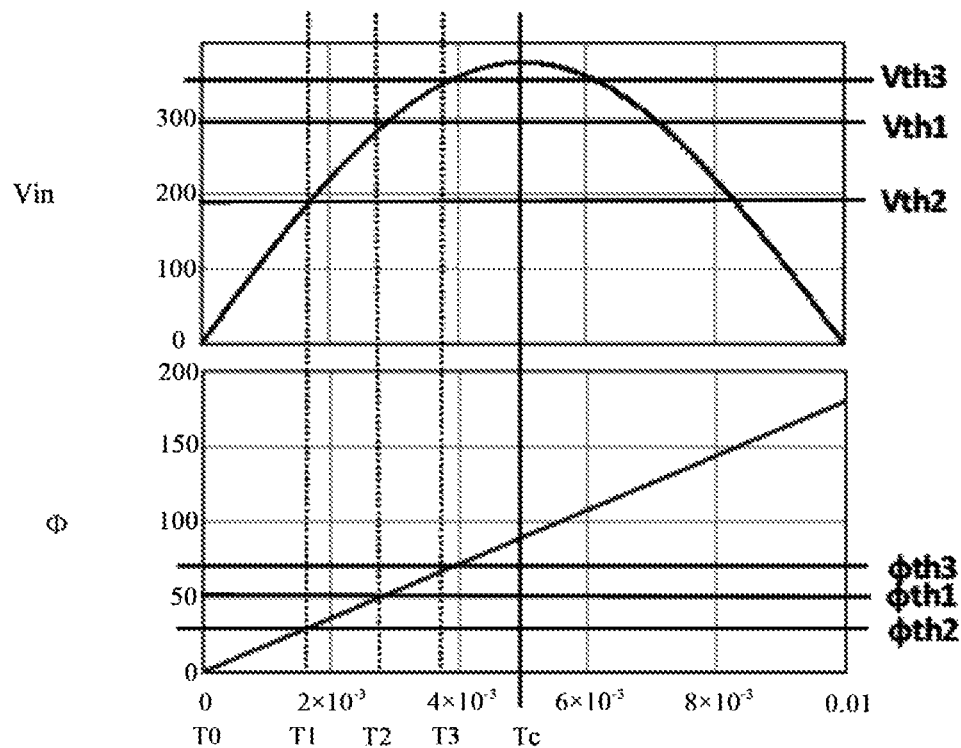
FIG. 9 is a schematic diagram of a control method for an AC-DC conversion circuit according to a sixth embodiment of the present disclosure.
Figure 10:
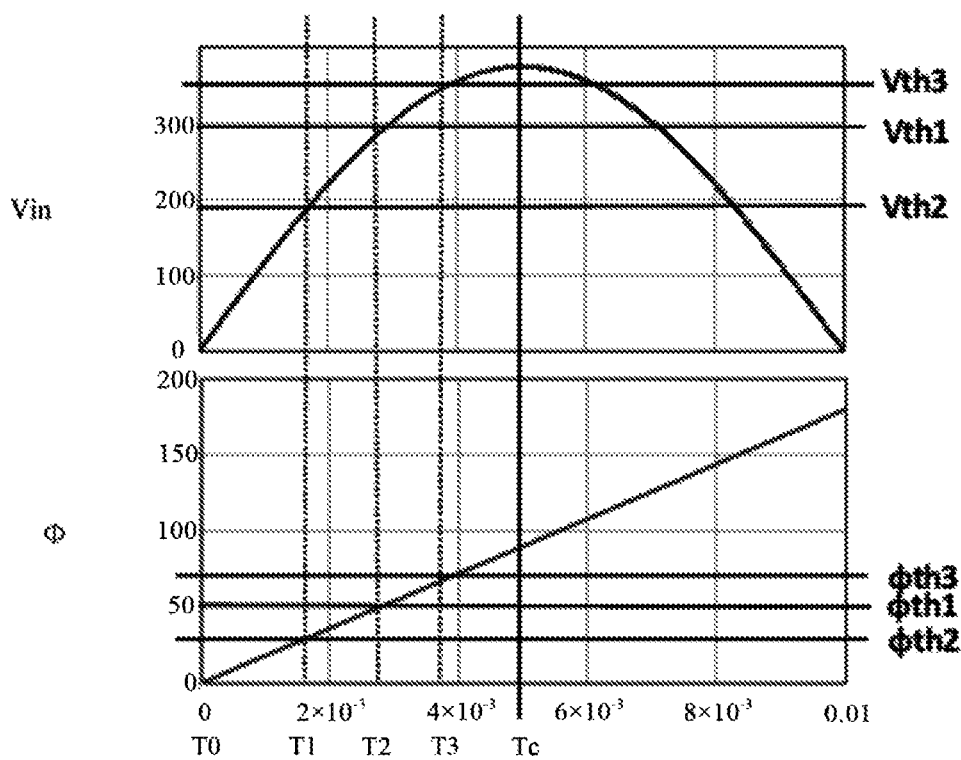
FIG. 10 is a schematic diagram of a control method for an AC-DC conversion circuit according to a seventh embodiment of the present disclosure.

Similarly, the phase threshold in the above embodiment may be directly set, or may be set according to the input current and at least one current threshold, or according to the input voltage and at least one voltage threshold. As shown in FIG. 9 or FIG. 10, where FIG. 9 is a schematic diagram of a control method for the AC-DC conversion circuit according to a sixth embodiment of the present disclosure, and FIG. 10 is a schematic diagram of a control method for the AC-DC conversion circuit according to a seventh embodiment of the present disclosure.

Referring to FIG. 9, at least one voltage threshold is set, and there is no limit to the number and value of the at least one voltage threshold. For example, the voltage threshold is set as Vth1, Vth2 and Vth3, and the phase thresholds $\Phi th1$, $\Phi th2$ and $\Phi th3$ are obtained by comparing the absolute value of the input voltage Vin with the voltage threshold.

Specifically, at the moment T1, the absolute value of the input voltage Vin is equal to the voltage threshold Vth2, and the working phase corresponds to the phase threshold $\Phi th2$ at this time; at the moment T3, the absolute value of the input voltage Vin is equal to the voltage threshold Vth3, and the working phase corresponds to the phase threshold $\Phi th3$ at this time; at the moment T2, the absolute value of the input voltage Vin is equal to the voltage threshold Vth1, the working phase corresponds to the phase threshold $\Phi th1$ at this time.

Referring to FIG. 10, at least one current threshold is set, and there is no limit to the number and value of the at least one current threshold. For example, the current threshold is set as Ith1, Ith2 and Ith3, and the phase threshold $\Phi th1$, $\Phi th2$, $\Phi th3$ are obtained by comparing the absolute value of the input current Iin with the current threshold.

Specifically, at the moment T1, the absolute value of the input current Iin is equal to the current threshold Ith2, and the working phase corresponds to the phase threshold Φth2 at this time; at the moment T3, the absolute value of the input current tin is equal to the current threshold Ith3, and the working phase corresponds to the phase threshold Φth3 at this time; at the moment T2, the absolute value of the input current Iin is equal to the current threshold Ith1, and the working phase corresponds to the phase threshold Φth1 at this time.

Figure 11:
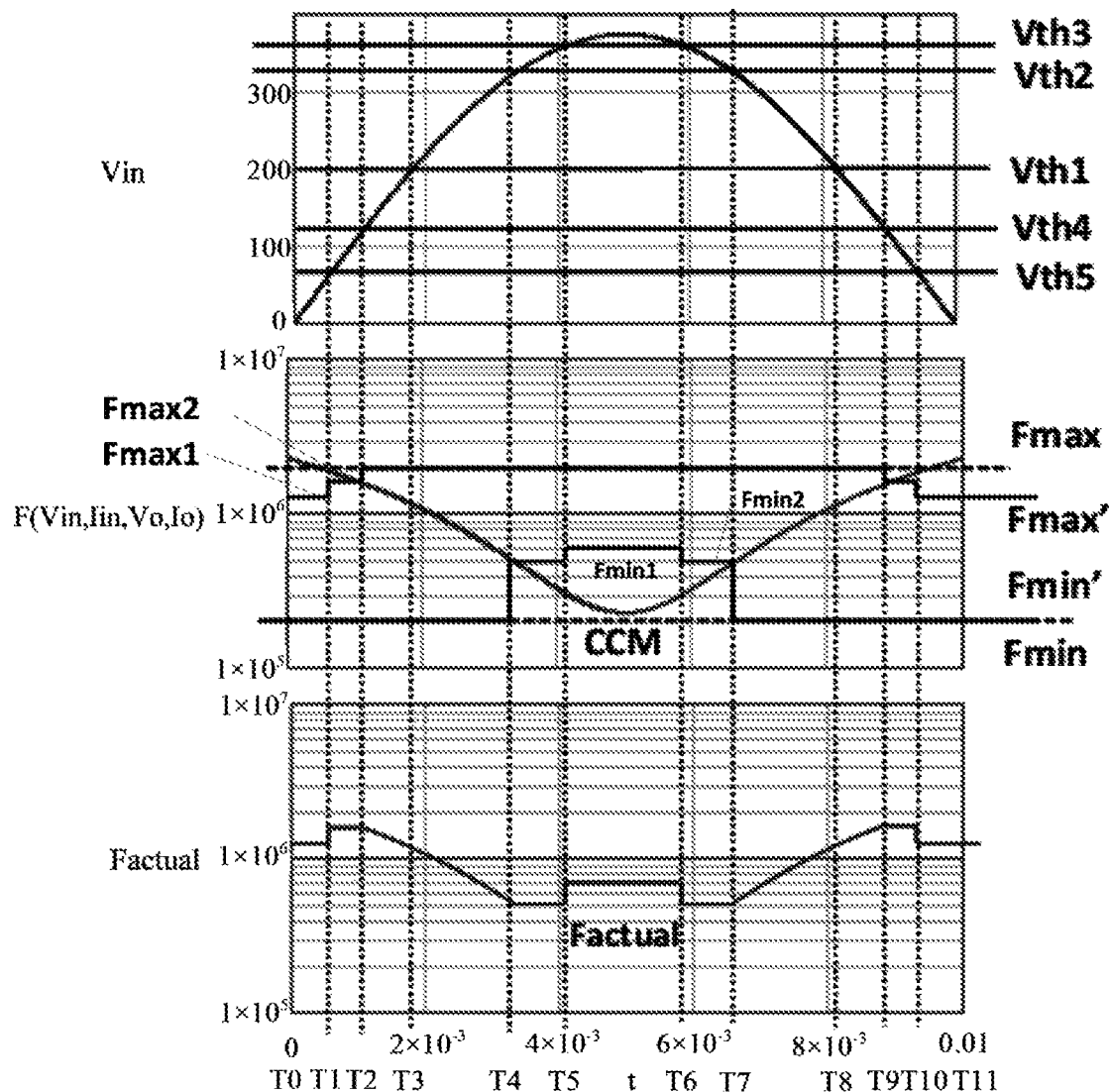
FIG. 11 is a schematic diagram of a control method for an AC-DC conversion circuit according to an eighth embodiment of the present disclosure.

Based on the above embodiments, FIG. 11 is a schematic diagram of a control method for the AC-DC conversion circuit according to an eighth embodiment of the present disclosure. Taking four voltage correction thresholds as an example to exemplify the scheme. Referring to FIG. 11, the switching frequency range is set as the preset Fmin~Fmax (as shown by the black dotted line), the switching frequency F is calculated based on the input voltage, input current, output voltage and output current. Taking the absolute value of the input voltage Vin as a reference, the ZVS and a better THD is realized by setting the first voltage threshold Vth1, comparing the absolute value of the input voltage with the first voltage threshold Vth1, and selecting the specific control logic of the AC-DC conversion circuit in the CRM. Further, four voltage correction thresholds Vth2, Vth3, Vth4, Vth5 are set (there is no limit to the number and value of voltage correction thresholds in the preset scheme), Fmin and Fmax are corrected through the four voltage correction thresholds Vth2, Vth3, Vth4, Vth5, and the corrected Fmin1/Fmin2 and Fmax1/Fmax2 are shown by the black solid line. Specifically, the absolute value of the input voltage is compared with the voltage thresholds Vth4 and Vth5 to adjust the Fmax, which can reduce the driving loss and facilitate the selection of circuit components and magnetic parts by reducing the maximum frequency threshold; the absolute value of the input voltage is compared with the voltage threshold Vth2 and Vth3 to adjust the Fmin, which can reduce the current ripple and improve the efficiency, and facilitate the EMI design.

During the time periods [T0-T1] and [T10-T11], the absolute value of the input voltage Vin is less than the voltage correction threshold Vth5, and the maximum frequency threshold Fmax during the time periods is adjusted to Fmax1, which is less than the preset Fmax.

During the time periods [T1-T2] and [T9-T10], the absolute value of the input voltage Vin is greater than the voltage correction threshold Vth5 but less than the voltage correction threshold Vth4, and the maximum frequency threshold Fmax during the time periods is adjusted to Fmax2, which is less than the preset Fmax, where there is no limit to the relationship between Fmax1 and Fmax2.

During the time period [T2-T9], the absolute value of the input voltage Vin is greater than the voltage correction threshold Vth4, the maximum frequency threshold during the time period is kept unchanged, which is the preset Fmax.

During the time period [T5-T6], the absolute value of the input voltage Vin is greater than the voltage correction threshold Vth3, and the minimum frequency threshold Fmin in this time period is adjusted to Fmin1, which is greater than the preset Fmin.

During the time periods [T4-T5] and [T6-T7], the absolute value of the input voltage Vin is greater than the voltage correction threshold Vth2 but less than the voltage correction threshold Vth3, and the minimum frequency threshold Fmin during the time periods is adjusted to Fmin2, which is greater than the preset Fmin, where there is no limit to the relationship between Fmin1 and Fmin2.

During the time periods [T0-T4] and [T7-T11], the absolute value of the input voltage Vin is less than the voltage correction threshold Vth2, Fmin is changed, so that the minimum frequency threshold in the time period is kept unchanged, which is the preset Fmin.

The input voltage is compared with the voltage correction threshold to obtain the corrected upper frequency limit Fmax1/Fmax2 and the corrected lower frequency limit Fmin1/Fmin2, as shown by the solid black line. Further, the switching frequency F is compared with the corrected switching frequency range to determine the actual switching frequency Factual, as shown in FIG. 11.

During the time periods [T0-T2] and [T9-T11], the switching frequency F is greater than Fmax2, and the AC-DC conversion circuit works in the DCM or the CCM, the driving loss is reduced by limiting the maximum switching frequency, and the selection of circuit components and magnetic parts is facilitated, meanwhile, in the DCM working mode, a better PF can be obtained by changing the charging time, and in the CCM working mode, ZVS can be realized, thereby reducing the switching loss.

During the time period [T4-T7], the switching frequency F is less than Fmin2, and the AC-DC conversion circuit works in the CCM, which can reduce the current ripple, improve the efficiency and facilitates the EMI design by selecting different CCM switching frequencies.

During the time periods [T2-T4] and [T7-T9], the switching frequency F is greater than Fmin2 but less than Fmax2, and the AC-DC conversion circuit works in the CRM, and the control strategy of the AC-DC conversion circuit under the CRM is selected by comparing the absolute value of the input voltage with the first voltage threshold Vth1. Specifically, during the time periods [T2-T3] and [T8-T9], the absolute value of the input voltage Vin is less than the first voltage threshold Vth1, and the AC-DC conversion circuit works in the VOT CRM, the THD of the input current when the input voltage crossing zero can be improved by changing the charging time of the inductor. During the time periods [T3-T4] and [T7-T8], the absolute value of the input voltage Vin is greater than the first voltage threshold Vth1, and the AC-DC conversion circuit works in the NCR CRM, ZVS can be realized by negative current, so as to reduce the switching loss.

As shown in FIG. 11, the AC-DC conversion circuit alternates between four working modes, and the actual switching frequency Factual is effectively limited to a certain range, so that the selection of circuit components and magnetic parts, and EMI design become simple, while the efficiency of the circuit, PF and THD are improved.

Figure 12:
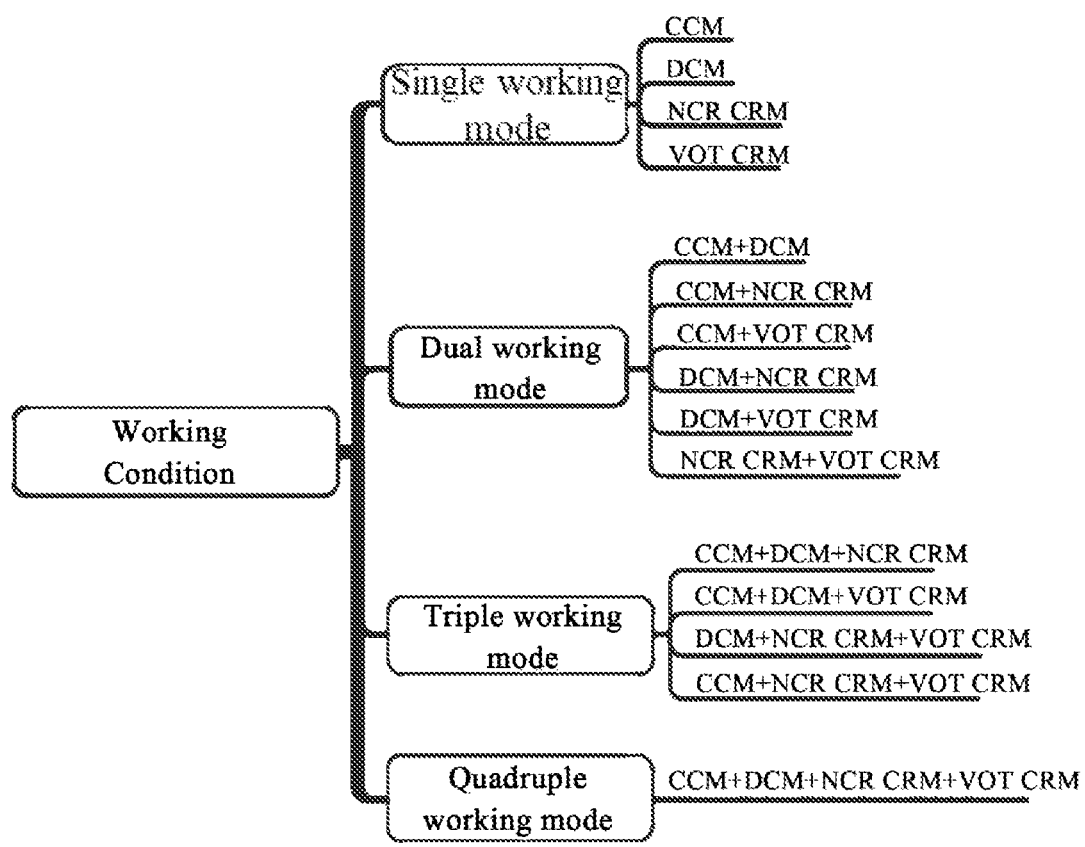
FIG. 12 is a schematic diagram of a combination of working modes according to an embodiment of the present disclosure.

Under different input voltages and load conditions, different combinations of working modes of the PFC circuit may occur. FIG. 12 is a schematic diagram of a combination of working modes according to an embodiment. As shown in FIG. 12, under different scenarios or working conditions, single working mode, dual working mode, triple working mode and quadruple working mode can be realized. Considering that Fmin and Fmax can be variable values or fixed value, and the number and value of the voltage threshold are not fixed, there are many ways to implement the scheme. For ease of description, FIGS. 13A to 15 respectively show the schematic diagrams of the control method in which the circuit works in the triple working mode, the dual working mode and the single working mode in a condition that Fmin and Fmax are fixed.

Figure 13A:
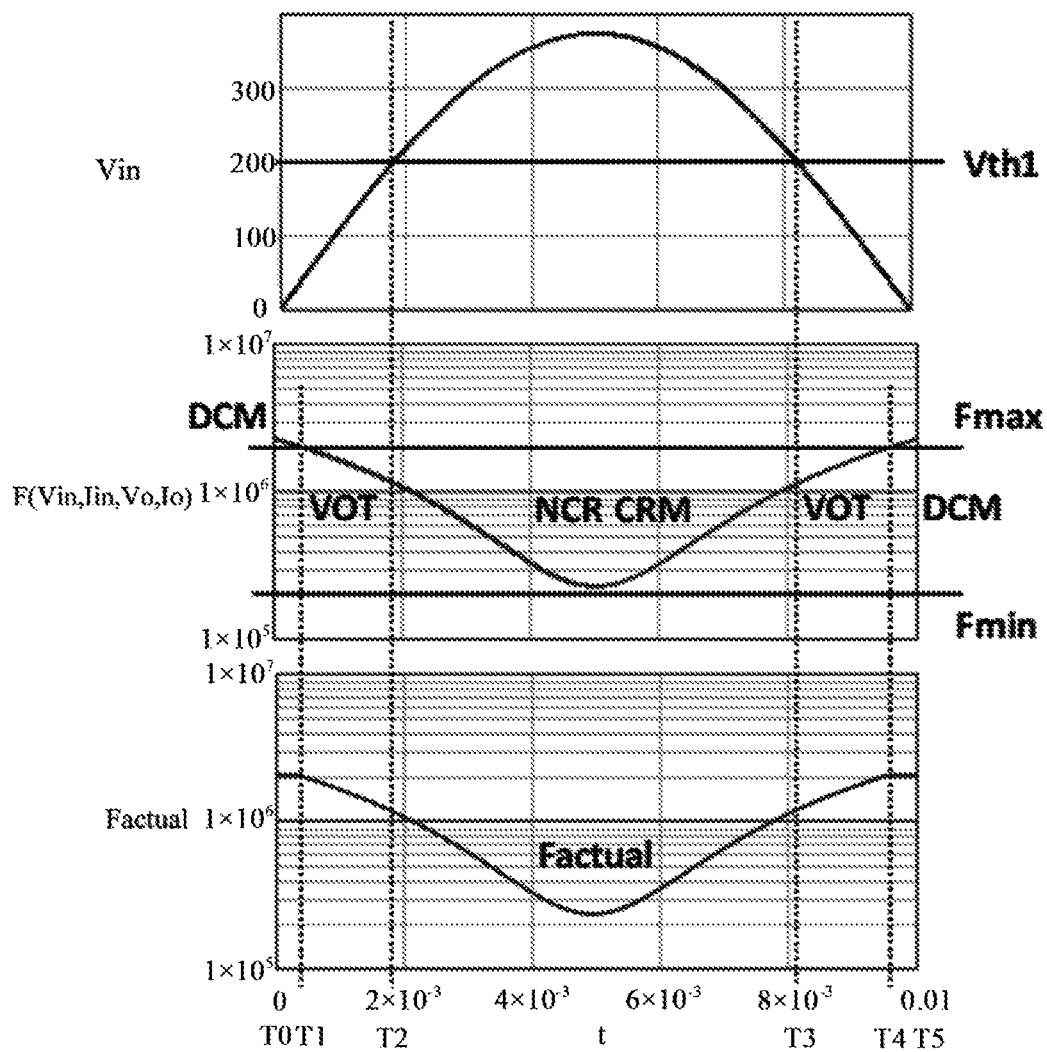
FIGS. 13A-13B are schematic diagrams of a control method for an AC-DC conversion circuit according to a ninth embodiment of the present disclosure.
Figure 13B:
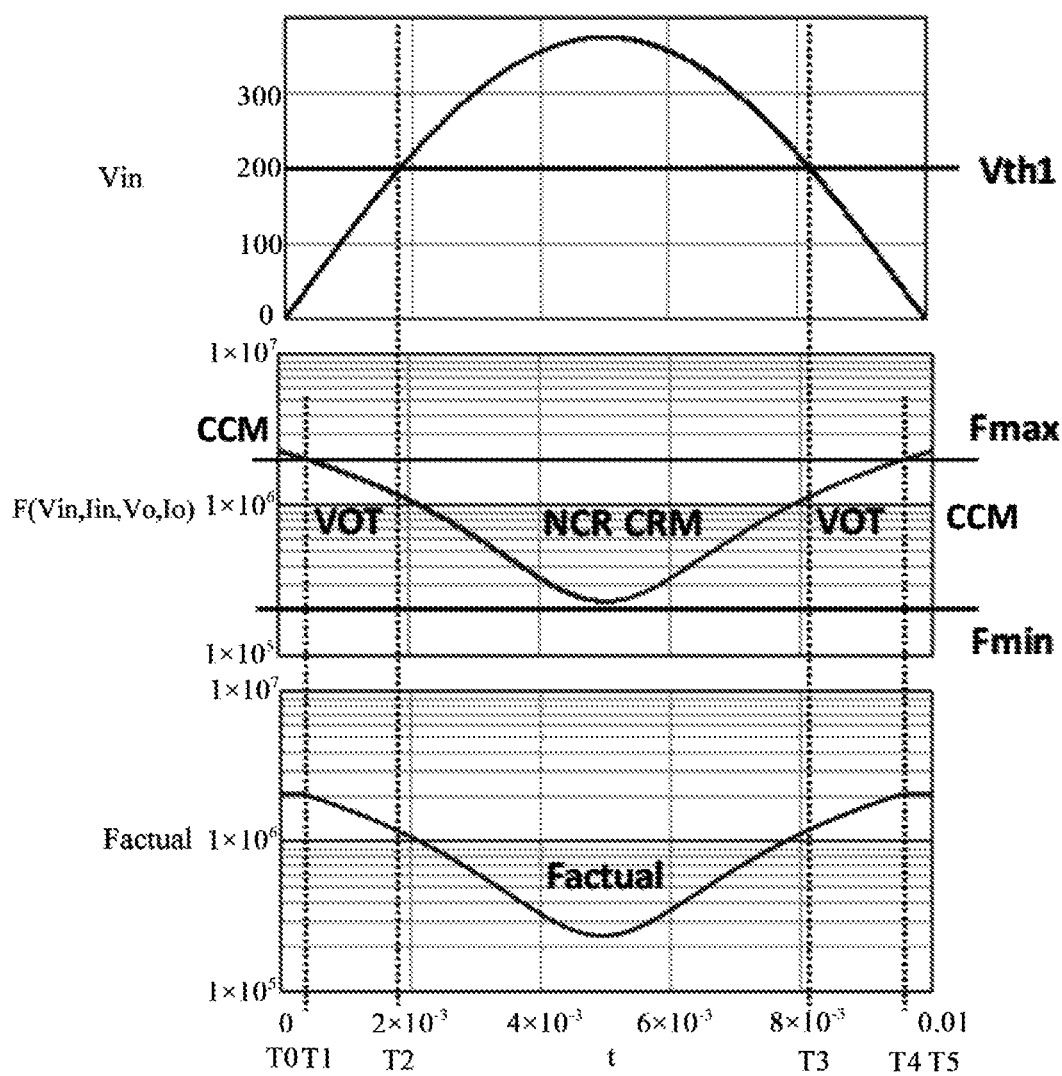

FIGS. 13A-13B are schematic diagrams of a control method for the AC-DC conversion circuit according to a ninth embodiment of the present disclosure. As shown in the FIGS. 13A-13B, the switching frequency range of the AC-DC conversion circuit is set as Fmin~Fmax (as shown by black solid line), the switching frequency F is calculated according to the input voltage, the input current, the output voltage and the output current, and the switching frequency F is compared with Fmin and Fmax to determine the actual switching frequency Factual. Further, taking the absolute value of the input voltage Vin as a reference, the first voltage threshold Vth1 is set, and the absolute value of the input voltage Vin is compared with the first voltage threshold Vth1 to select the control method of the circuit under the CRM, so as to realize ZVS and a better THD.

During the time periods [T0-T1] and [T4-T5], the switching frequency F is greater than Fmax, the actual switching frequency Factual is set to Fmax, the AC-DC conversion circuit works in the DCM as shown in FIG. 13A, or the AC-DC conversion circuit works in the CCM as shown in FIG. 13B. The driving loss is reduced by reducing the maximum frequency threshold, and the selection of circuit components and magnetic parts is facilitated, meanwhile, in the DCM working mode, a better PF can be obtained by changing the charging time, and in the CCM working mode, ZVS can be realized to reduce switching loss.

During the time period [T1-T4], the switching frequency F is greater than Fmin but less than Fmax, the AC-DC conversion circuit works in the CRM, and the specific control method under the CRM is selected by comparing the absolute value of the input voltage with the first voltage threshold Vth1. During the time periods [T1-T2] and [T3-T4], the absolute value of the input voltage Vin is less than the first voltage threshold Vth1, and the AC-DC conversion circuit works in the VOT CRM, the THD of the input current when the input voltage crossing zero can be improved by changing the charging time of the inductor. During the time period [T2-T3], the absolute value Vin of the input voltage is greater than the first voltage threshold Vth1, and the AC-DC conversion circuit works in the NCR CRM, ZVS can be realized by negative current, thereby reducing the switching loss.

As shown in FIGS. 13A-13B, under the conditions of the output voltage and the load, the AC-DC conversion circuit alternates between three working modes, and the actual switching frequency Factual is effectively limited to a certain range, so that the selection of circuit components and magnetic parts, and EMI design become simple, while the efficiency of the circuit, PF and THD are improved.

Figure 14A:
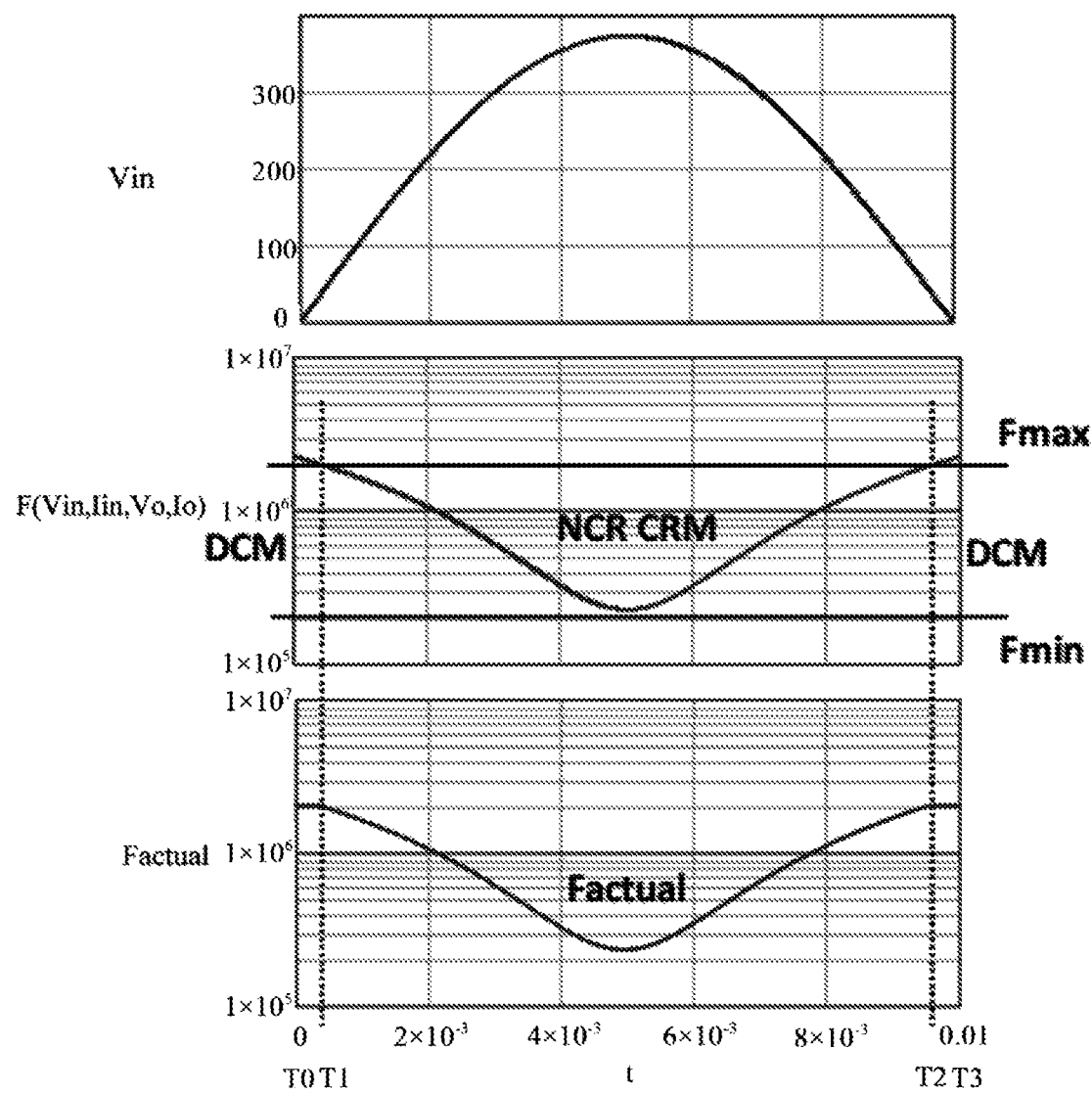
FIGS. 14A-14B are schematic diagrams of a control method for an AC-DC conversion circuit according to a tenth embodiment of the present disclosure.
Figure 14B:
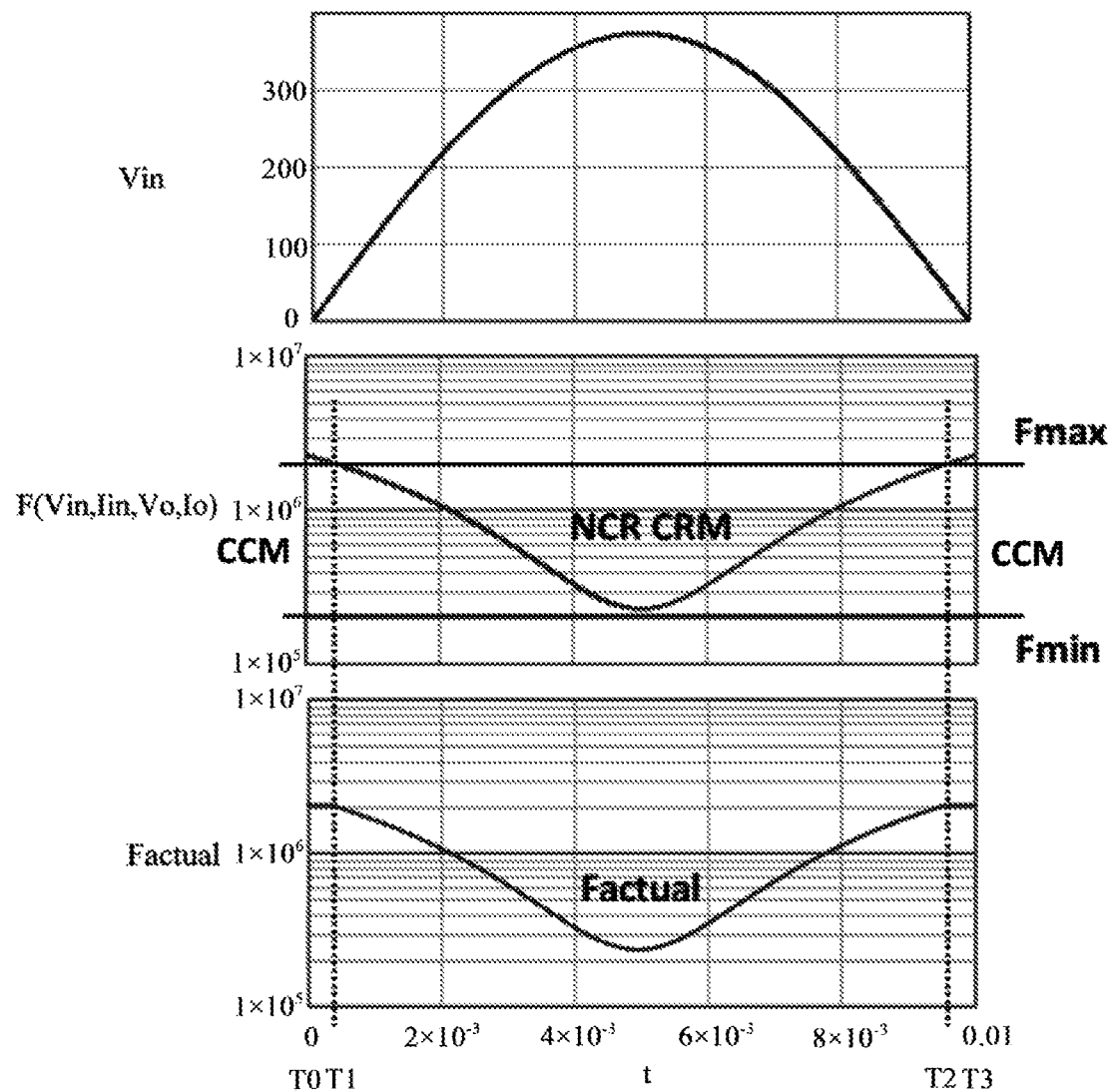

FIGS. 14A-14B are schematic diagrams of an AC-DC conversion circuit control method according to a tenth embodiment of the present disclosure. In FIGS. 14A-14B, the switching frequency range of the AC-DC conversion circuit is set as Fmin~Fmax (as shown by black solid line), the switching frequency F is calculated according to the input voltage, the input current, the output voltage and the output current, and the switching frequency F is compared with Fmin and Fmax to determine the actual switching frequency Factual.

During the time periods [T0-T1] and [T2-T3], the switching frequency F is greater than Fmax, the actual switching frequency Factual is set to Fmax, the AC-DC conversion circuit works in the DCM as shown in FIG. 14A, or the AC-DC conversion circuit works in the CCM as shown in FIG. 14B. The driving loss is reduced by reducing the maximum frequency threshold, and the selection of circuit components and magnetic parts is facilitated, meanwhile, in the DCM working mode, a better PF can be obtained by changing the charging time, and in the CCM working mode, ZVS can be realized to reduce switching loss.

During the time period [T1-T2], the switching frequency F is greater than Fmin but less than Fmax, and the AC-DC conversion circuit works in the NCR CRM during the time period, ZVS can be realized by negative current, thereby reducing the switching loss.

As shown in FIGS. 14A-14B, under the conditions of the output voltage and the output current, the AC-DC conversion circuit alternates between two working modes, and the actual switching frequency Factual is effectively limited to a certain range, so that the selection of circuit components and magnetic parts, and EMI design become simple, while the efficiency of the circuit, PF and THD are improved.

Figure 15A:
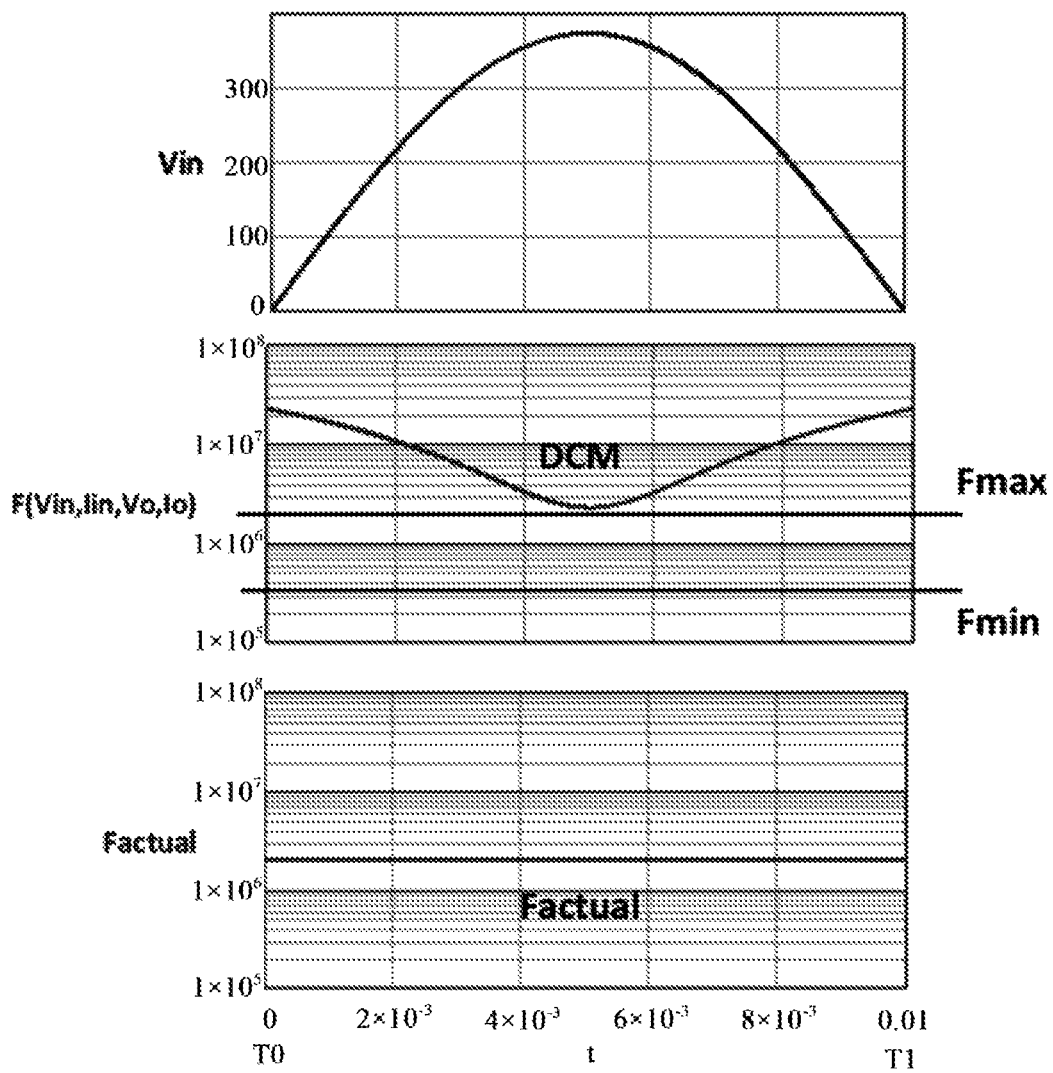
FIGS. 15A-15B are schematic diagrams of a control method for an AC-DC conversion circuit according to an eleventh embodiment of the present disclosure.
Figure 15B:
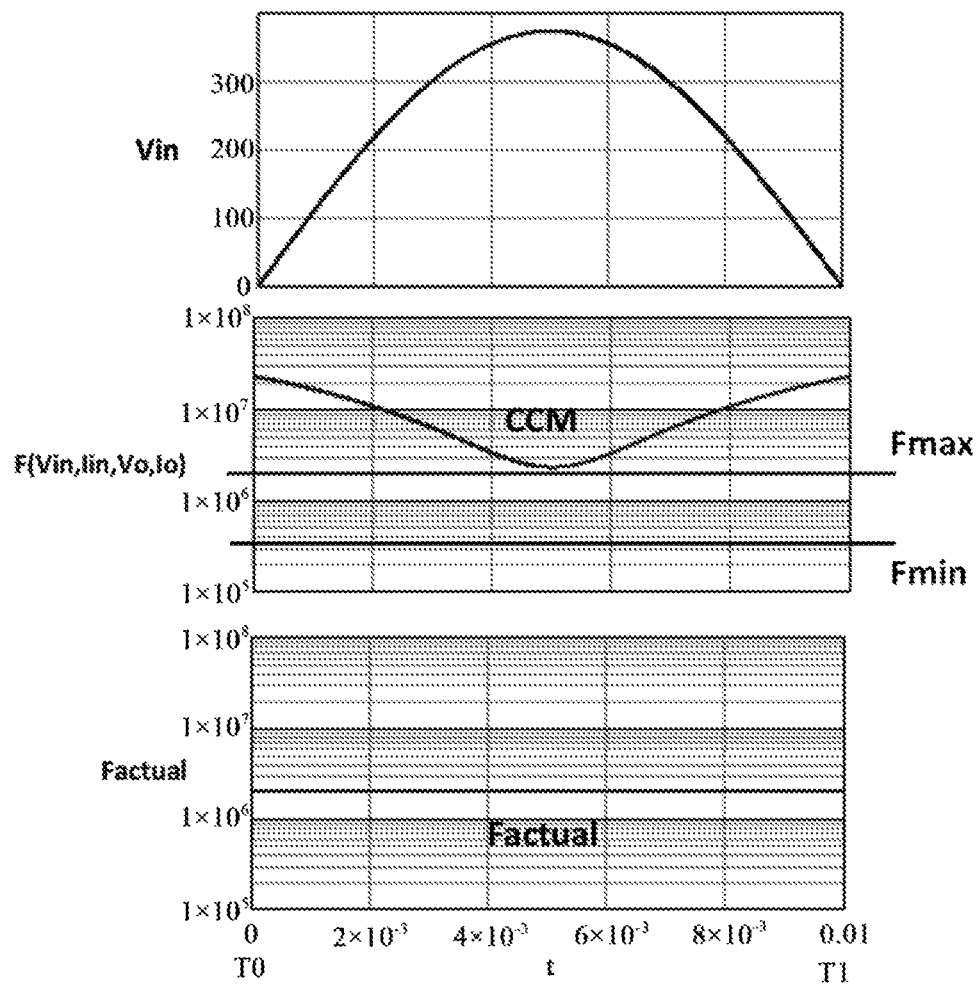

FIGS. 15A-15B are schematic diagrams of an AC-DC conversion circuit control method according to an eleventh embodiment of the present disclosure. In FIGS. 15A-15B, the switching frequency range of the circuit is set as fixed Fmin Fmax (as shown by the black solid line), and the switching frequency F is calculated based on the input voltage, the output voltage and the load, and the switching frequency F is compared with Fmin and Fmax to determine the actual switching frequency Factual.

During the entire time period [T0-T1], the switching frequency F is greater than Fmax, so that the actual switching frequency Factual is set to Fmax, and the AC-DC conversion circuit works in the DCM during the entire period as shown in FIG. 15A, or the AC-DC conversion circuit works in the CCM during the entire period as shown in FIG. 15B. The driving loss is reduced by reducing the maximum frequency threshold, and the selection of circuit components and magnetic parts is facilitated, meanwhile, in the DCM working mode, a better PF can be obtained by changing the charging time, and in the CCM working mode, ZVS can be realized to reduce switching loss.

As shown in FIGS. 15A-15B, under the conditions of the input voltage and the load, the AC-DC conversion circuit has only one working mode, and the actual switching frequency Factual is effectively limited to a certain range, so that the selection of circuit components and magnetic parts, and EMI design become simple, while the efficiency of the circuit, PF and THD are improved.

In summary, the bridgeless PFC circuit control method proposed in the present disclosure can effectively limit the switching frequency range of the PFC circuit, and achieve better THD, PF, efficiency and EMI characteristics under different input voltages and full-range load conditions.

Based on the above embodiment, a control method for the AC-DC conversion circuit includes: acquiring circuit parameter information of the AC-DC conversion circuit; and limiting an actual switching frequency or an actual switching period of the AC-DC conversion circuit within a preset working range according to the circuit parameter information, in an entire load range.

In a possible embodiment, the circuit parameter information includes one or more of the following: an input voltage, an input current, an output voltage and an output current.

In a possible embodiment, the present disclosure calculates the switching frequency or the switching period based on the circuit parameter information of the AC-DC conversion circuit, which is compared with the preset working range to obtain the actual switching frequency or the actual switching period of the AC-DC conversion circuit.

In a condition that the switching frequency reaches an upper limit of the preset switching frequency range, the actual switching frequency of the AC-DC conversion circuit is controlled to be the upper limit; in a condition that the switching frequency reaches a lower limit of the preset switching frequency range, the actual switching frequency of the AC-DC conversion circuit is controlled to be the lower limit.

Further, in a condition that the switching frequency exceeds the upper limit of the preset switching frequency range, the AC-DC conversion circuit is controlled to work in DCM or CCM; in a condition that the switching frequency is within the preset switching frequency range, the AC-DC conversion circuit is controlled to work in CRM; in a condition that the switching frequency is lower than the lower limit of the preset switching frequency range, the AC-DC conversion circuit is controlled to work in CCM.

Further, when the AC-DC conversion circuit works in the CRM: a control logic is determined according to at least one variable of the absolute value of the input voltage, the working time and the working phase and the preset first parameter threshold; in a condition that the variable is less than or equal to the first parameter threshold, the control circuit is controlled to work in a VOT CRM, and the charging time of an inductor of the AC-DC conversion circuit is controlled; in a condition that the variable is greater than the first parameter threshold, the control circuit is controlled to work in a NCR CRM, and the inductor current is controlled to reach negative value to realize ZVS of power switches.

In a possible implementation, the present disclosure sets at least one parameter correction threshold, and corrects an upper limit of the preset working range and/or a lower limit of the preset working range according to at least one variable of the absolute value of the input voltage, the working time and the working phase of the AC-DC conversion circuit, where the parameter correction threshold may be a voltage correction threshold, a time correction threshold, a phase correction threshold, and the like.

Figure 16:
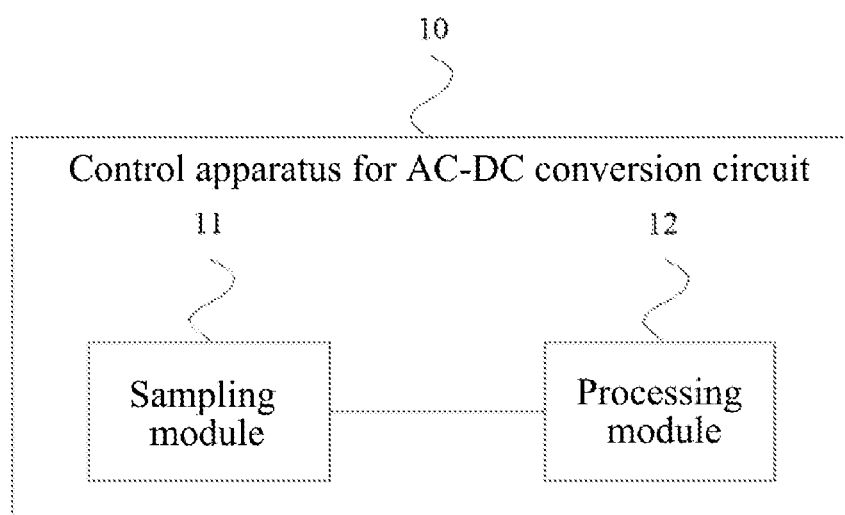
FIG. 16 is a schematic structural diagram of a control apparatus for the AC-DC conversion circuit according to embodiments of the present disclosure.

FIG. 16 is a schematic structural diagram of a control apparatus for the AC-DC conversion circuit according to an embodiment of the present disclosure. Referring to FIG. 16, the control apparatus 10 includes: a sampling module 11, configured to detect input information and output information of an AC-DC conversion circuit; and a processing module 12, configured to calculate working information of an AC-DC conversion circuit according to the input information and the output information of the AC-DC conversion circuit, wherein the input information includes an input voltage and an input current, the output information includes an output voltage and an output current, and the working information includes a switching frequency or a switching period.

And the processing module 12 is further configured to compare the working information of the AC-DC conversion circuit with a preset working range to determine an actual working information and working mode of the AC-DC conversion circuit, which can improve the THD, PF, efficiency and EMI and the like of the AC-DC conversion circuit.

In a possible design, the processing module 12 is configured to compare the switching frequency of the AC-DC conversion circuit with the preset switching frequency range to obtain an actual switching frequency of the AC-DC conversion circuit.

In a condition that the switching frequency is greater than or equal to a maximum frequency threshold, the processing module 12 is configured to control the AC-DC conversion circuit to work in DCM or a CCM, and control the actual switching frequency of the AC-DC conversion circuit to be the maximum frequency threshold, wherein the maximum frequency threshold is an upper limit of the preset switching frequency range.

In a condition that the switching frequency is less than or equal to a minimum frequency threshold, the processing module 12 is configured to control the AC-DC conversion circuit to work in CCM, and control the actual switching frequency of the AC-DC conversion circuit to be the minimum frequency threshold, wherein the minimum frequency threshold is a lower limit of the preset switching frequency range.

In a condition that the switching frequency is less than the maximum frequency threshold but greater than the minimum frequency threshold, the processing module 12 is configured to control the AC-DC conversion circuit to work in CRM.

In a possible design, when the AC-DC conversion circuit works in CRM, the processing module 12 is further configured to determine a control logic according to the absolute value of the input voltage and a first voltage threshold. In a condition that the absolute value of the input voltage is less than or equal to the first voltage threshold, the processing module 12 is configured to control the AC-DC conversion circuit to work in VOT CRM, and control to change a charging time of an inductor in the AC-DC conversion circuit. In a condition that the absolute value of the input voltage is greater than the first voltage threshold, the processing module 12 is configured to control the AC-DC conversion circuit to work in NCR CRM, and control the inductor current to reach a negative value to realize zero voltage switching ZVS of power switches.

Figure 17:
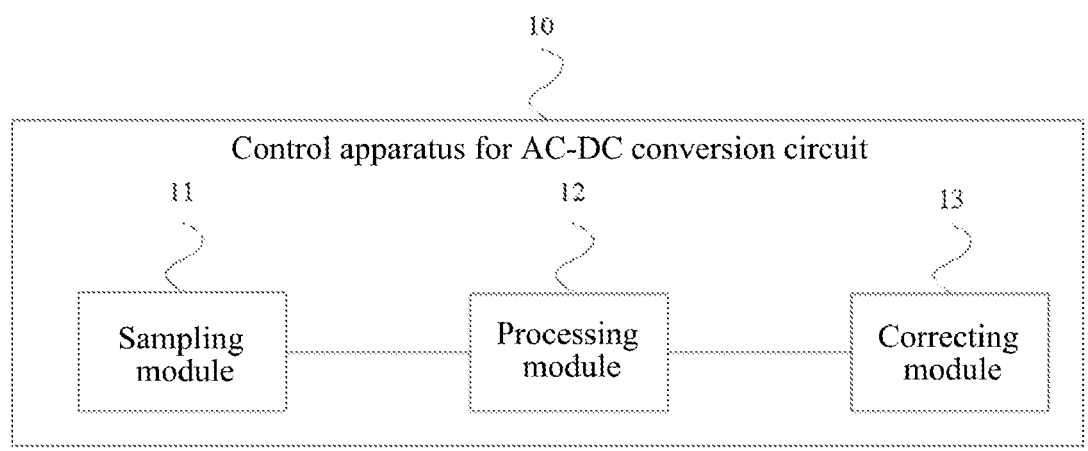
FIG. 17 is a schematic structural diagram of another control apparatus for the AC-DC conversion circuit according to embodiments of the present disclosure.

On the basis of the above embodiment, FIG. 17 is a schematic structural diagram of a control apparatus for the AC-DC conversion circuit according to an embodiment of the present disclosure. Referring to FIG. 17, the apparatus 10 further includes a correcting module 13, configured to correct the maximum frequency threshold and the minimum frequency threshold according to at least one variable of an absolute value of the input voltage, a working time, and a working phase of the AC-DC conversion circuit.

In a possible design, the correcting module 13 sets a first voltage correction threshold and a second voltage correction threshold. During a time period that the absolute value of the input voltage is less than or equal to the first voltage correction threshold, the correcting module 13 corrects the maximum frequency threshold as a maximum correction threshold, wherein the maximum correction threshold is less than the maximum frequency threshold. During a time period that the absolute value of the input voltage is greater than the first voltage correction threshold, the correcting module 13 keeps the maximum frequency threshold unchanged. During a time period that the absolute value of the input voltage is greater than or equal to the second voltage correction threshold, the correcting module 13 corrects the minimum frequency threshold as a minimum correction threshold, wherein the minimum correction threshold is greater than the minimum frequency threshold. During a time period that the absolute value of the input voltage is less than the second voltage correction threshold, the correcting module 13 keeps the minimum frequency threshold unchanged.

In a possible design, the correction module 13 sets a first time correction threshold and a second time correction threshold. During a time period that the working time is less than or equal to the first time correction threshold, the correction module 13 corrects the maximum frequency threshold as a maximum correction threshold, wherein the maximum correction threshold is less than the maximum frequency threshold. During a time period that the working time is greater than the first time correction threshold, the correction module 13 keeps the maximum frequency threshold unchanged. During a time period that the working time is greater than or equal to the second time correction threshold, the correction module 13 corrects the minimum frequency threshold as a minimum correction threshold, wherein the minimum correction threshold is greater than the minimum frequency threshold. During a time period that the working time is less than the second time correction threshold, keeps the minimum frequency threshold unchanged In a possible design, the correction module 13 sets a first phase correction threshold and a second phase correction threshold. During a time period that the working phase is less than or equal to the first phase correction threshold, the correction module 13 corrects the maximum frequency threshold as a maximum correction threshold, wherein the maximum correction threshold is less than the maximum frequency threshold. During a time period that the working phase is greater than the first phase correction threshold, the correction module 13 keeps the maximum frequency threshold unchanged. During a time period that the working phase is greater than or equal to the second phase correction threshold, the correction module 13 corrects the minimum frequency threshold as a minimum correction threshold, wherein the minimum correction threshold is greater than the minimum frequency threshold. During a time period that the working phase is less than the second phase correction threshold, the correction module 13 keeps the minimum frequency threshold unchanged.

The control apparatus of the AC-DC conversion circuit provided in the embodiment can execute the technical solutions of the above method embodiments, and their implementation principles and technical effects are similar, which will not be repeated hereby.

Figure 18:
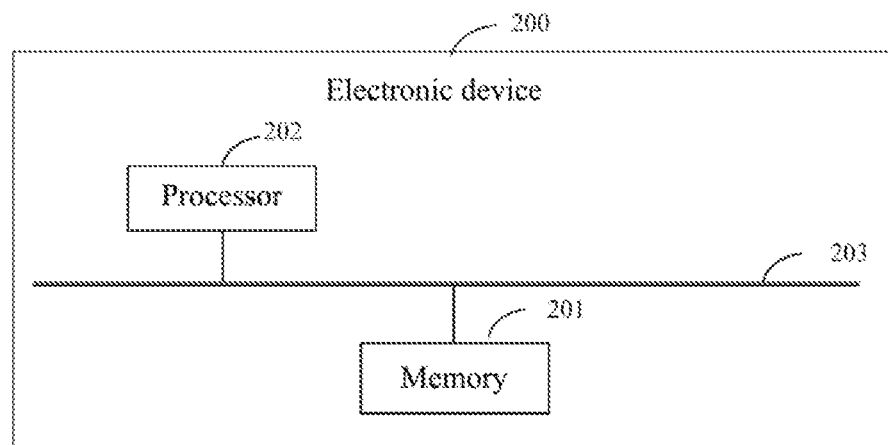
FIG. 18 is a schematic diagram of a hardware structure of an electronic device according to an embodiment of the present disclosure.

An embodiment of the present disclosure further provides a terminal device, referring to FIG. 18, the embodiment of the present disclosure is only illustrated by the example of FIG. 18, which does not mean that the scheme is limited thereto.

FIG. 18 is a schematic diagram of a hardware structure of an electronic device according to an embodiment of the present disclosure. Referring to FIG. 18, the electronic device 200 provided in the embodiment may include: a memory 201 and a processor 202. In an embodiment, the electronic device 200 further includes a bus 203. The bus 203 is used to realize the connection between the components. The memory 201 stores computer execution instructions; and the processor 202 executes the computer execution instructions stored in the memory 201 to execute control method for the AC-DC conversion circuit according to the foregoing embodiments in the first device side.

The memory and the processor are directly or indirectly electrically connected to realize the control of the AC-DC conversion circuit. For example, these components can be electrically connected to each other through one or more communication buses or signal lines. The memory stores computer execution instructions for implementing the data access control method, including at least one software function module that can be stored in the memory in the form of software or firmware. The processor executes various functional applications and data processing by running the software programs and modules stored in the memory.

The memory may be, but not limited to, Random Access Memory (RAM), Read Only Memory (ROM), Programmable Read-Only Memory (PROM), Erasable Programmable Read-Only Memory (EPROM), Electric Erasable Programmable Read-Only Memory (EEPROM) and etc. The memory is configured to store a program, and the processor executes the program after receiving the execution instruction. Further, the software program and module in the foregoing memory may further include a working system, which may include various software components and/or drivers for managing system tasks (e.g., memory management, storage device control, power management, etc.), and it may communicate with various hardware or software components to provide a working environment for other software components.

The processor may be an integrated circuit chip capable of signal processing. The foregoing processor 202 may be a general processing unit, including Central Processing Unit (CPU), Network Processor (NP), and the like. The methods, steps, and logic diagrams disclosed in the embodiments of the scheme may be implemented or executed. The general processing unit may be a microprocessor, or the processor may be any conventional processor or the like.

An embodiment of the present disclosure further provides a computer-readable storage medium on which computer execution instructions are stored. When the computer execution instructions are executed by the processor, the AC-DC conversion circuit control method according to any of the foregoing embodiments may be implemented.

The computer-readable storage medium in the embodiment may be any available medium that can be accessed by a computer, or a data storage device such as a server or data center that includes one or more available medium integration. The available medium may be a magnetic medium (e.g., Floppy disk, hard disk, magnetic tape), an optical medium (e.g., DVD), or a semiconductor medium (e.g., SSD), etc.

A person skilled in the art may understand that all or part of the steps for implementing the method of the foregoing embodiments may be completed by hardware relevant to program instructions. The aforementioned program may be stored in a computer-readable storage medium. When the program is executed, the steps of the foregoing method embodiments are executed; the foregoing storage medium includes various medium that can store program codes, such as a hard disk, ROM, RAM, magnetic disk, or optical disk.

Finally, it should be noted that the above embodiments are only used to illustrate the technical solutions of the scheme, rather than intending to limited thereto; although the scheme has been described in detail with reference to the foregoing embodiments, a person skilled in the art should understand that: the technical solutions described in the foregoing embodiments can still be modified, or some or all of the technical features therein can be equivalently replaced; and these modifications or variations do not deviate the essence of the corresponding technical solutions from the scope of the technical solutions of the embodiments in the present disclosure.

What is claimed is:

1. A control method for an AC-DC conversion circuit, comprising:
    acquiring circuit parameter information of the AC-DC conversion circuit, wherein the circuit parameter information comprises one or more of the following: an input voltage, an input current, an output voltage and an output current of the AC-DC conversion circuit;
    limiting an actual switching frequency or an actual switching period of the AC-DC conversion circuit within a preset working range according to the circuit parameter information, in an entire load range;

in a condition that a calculated switching frequency is greater than or equal to an upper limit of a preset switching frequency range, controlling the actual switching frequency of the AC-DC conversion circuit to be the upper limit of the preset switching frequency range;

in a condition that the calculated switching frequency is less than or equal to a lower limit of the preset switching frequency range, controlling the actual switching frequency of the AC-DC conversion circuit to be the lower limit of the preset switching frequency range;

in a condition that the calculated switching frequency is greater than or equal to the upper limit of the preset switching frequency range, controlling the AC-DC conversion circuit to work in a discontinuous conduction mode (DCM) or a continuous conduction mode (CCM) or a variable on-time critical conduction mode (VOT CRM);

in a condition that the calculated switching frequency is within the preset switching frequency range, controlling the AC-DC conversion circuit to work in a critical conduction mode (CRM); and in a condition that the calculated switching frequency is less than or equal to the lower limit of the preset switching frequency range, controlling the AC-DC conversion circuit to work in the CCM;

when the AC-DC conversion circuit is in the CRM, the method further comprising:

comparing at least one variable of an absolute value of the input voltage, a working time and a working phase with a first parameter threshold;

in a condition that the at least one variable is less than or equal to the first parameter threshold, controlling the AC-DC conversion circuit to work in the VOT CRM, and controlling the AC-DC conversion circuit to change a charging time of an inductor in the AC-DC conversion circuit; and in a condition that the at least one variable is greater than the first parameter threshold, controlling the AC-DC conversion circuit to work in a negative current critical conduction mode (NCR CRM), and controlling an inductor current to reach a negative value to realize zero voltage switching (ZVS) of a switch of the AC-DC conversion circuit.

* * * * *